(12) United States Patent
Hong et al.

(10) Patent No.: US 11,860,466 B2
(45) Date of Patent: Jan. 2, 2024

(54) OPTICAL PATH CONTROL MEMBER AND DISPLAY DEVICE COMPRISING SAME

(71) Applicant: LG INNOTEK CO., LTD., Seoul (KR)

(72) Inventors: Hyeon Ji Hong, Seoul (KR); In Hae Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 17/923,484

(22) PCT Filed: Apr. 15, 2021

(86) PCT No.: PCT/KR2021/004762
§ 371 (c)(1),
(2) Date: Nov. 4, 2022

(87) PCT Pub. No.: WO2021/225297
PCT Pub. Date: Nov. 11, 2021

(65) Prior Publication Data
US 2023/0194917 A1    Jun. 22, 2023

(30) Foreign Application Priority Data

May 7, 2020   (KR) .................. 10-2020-0054203
May 11, 2020  (KR) .................. 10-2020-0056079

(51) Int. Cl.
*G02F 1/1335*  (2006.01)
*G02F 1/1334*  (2006.01)

(52) U.S. Cl.
CPC ...... *G02F 1/133512* (2013.01); *G02F 1/1334* (2013.01); *G02F 1/133519* (2021.01)

(58) Field of Classification Search
None
See application file for complete search history.

(56) References Cited

U.S. PATENT DOCUMENTS

| 9,761,834 B2 | 9/2017 | Oh et al. |
| 9,874,799 B2 | 1/2018 | Shiota |
| 2016/0252812 A1* | 9/2016 | Yamada ............... G03F 7/0388 257/40 |

(Continued)

FOREIGN PATENT DOCUMENTS

| JP | 2013-218176 A | 10/2013 |
| KR | 10-2015-0129123 A | 11/2015 |

(Continued)

*Primary Examiner* — Ryan Crockett
(74) *Attorney, Agent, or Firm* — Birch, Stewart, Kolasch & Birch, LLP

(57) ABSTRACT

An optical path control member according to an embodiment comprises an adhesive layer disposed between a second electrode and a light conversion part, wherein: the light conversion part includes a partition wall part and a reception part alternately arranged; the partition wall part includes a first area from the upper surface of the partition wall part up to 30 μm in a direction toward the first substrate, a third area from the lower surface of the partition wall part up to 30 μm in a direction toward the second substrate, and a second area provided between the first area and the third area; and Si measured by XPS in the first area corresponds to 2 at % or less.

20 Claims, 17 Drawing Sheets

(56) References Cited

U.S. PATENT DOCUMENTS

| | | | |
|---|---|---|---|
| 2017/0010516 A1* | 1/2017 | Shiota | G02F 1/133602 |
| 2017/0059916 A1 | 3/2017 | Park et al. | |
| 2018/0039125 A1* | 2/2018 | Kubota | G06F 3/0412 |
| 2023/0185151 A1* | 6/2023 | Son | G02F 1/167 |
| | | | 359/296 |

FOREIGN PATENT DOCUMENTS

| | | | |
|---|---|---|---|
| KR | 10-2016-0002196 A | | 1/2016 |
| KR | 10-2016-0100294 A | | 8/2016 |
| KR | 10-2017-0018237 A | | 2/2017 |
| KR | 10-2018-0004879 | * | 1/2018 |
| KR | 10-2018-0004879 A | | 1/2018 |
| KR | 10-2018-0058951 A | | 6/2018 |
| WO | WO2015/122083 A1 | | 8/2015 |

\* cited by examiner

[FIG. 1]
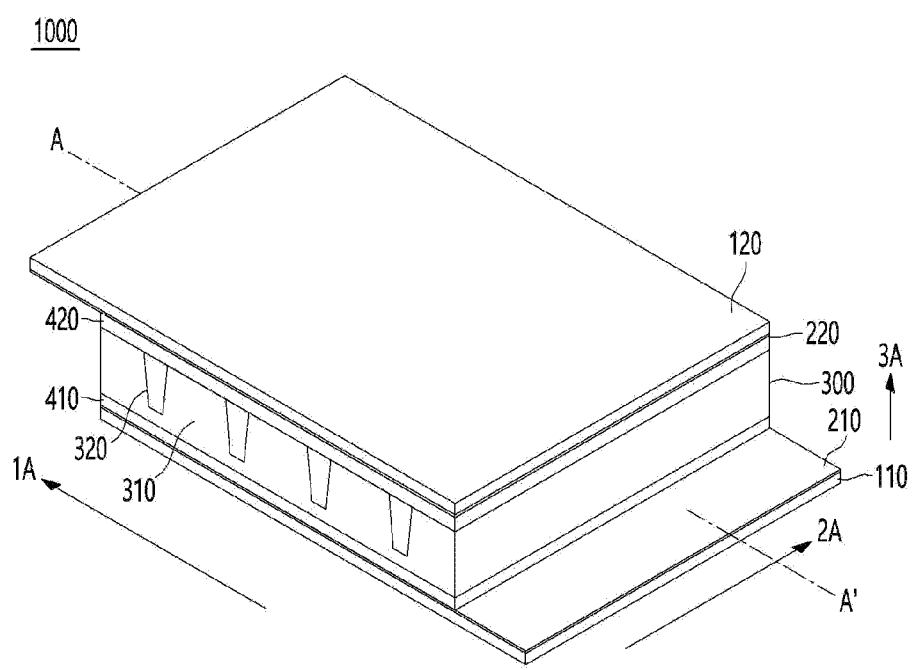

[FIG. 2]
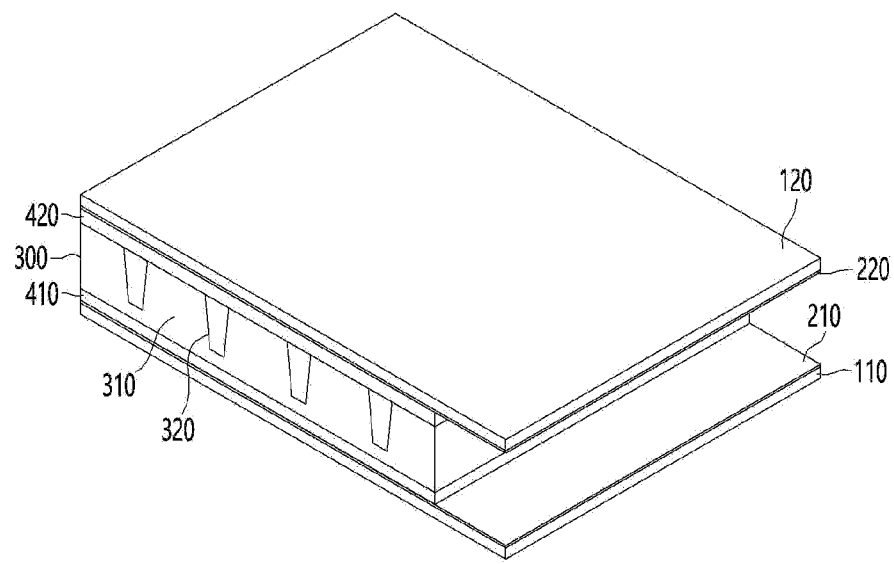
[FIG. 3]
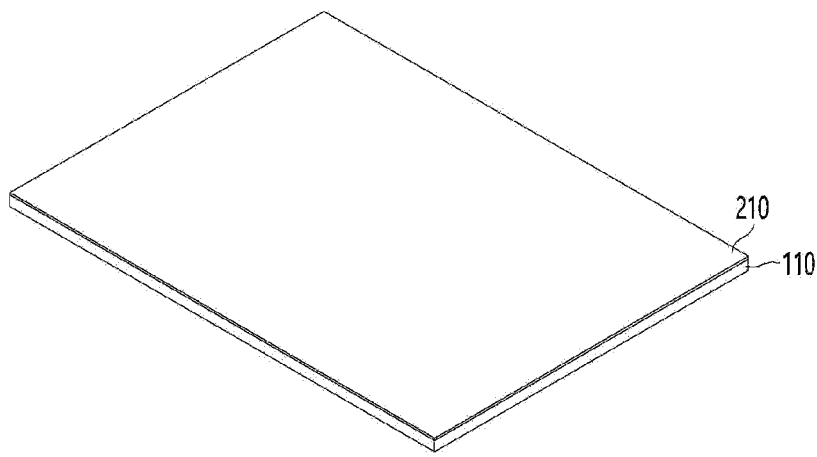

[FIG. 4]
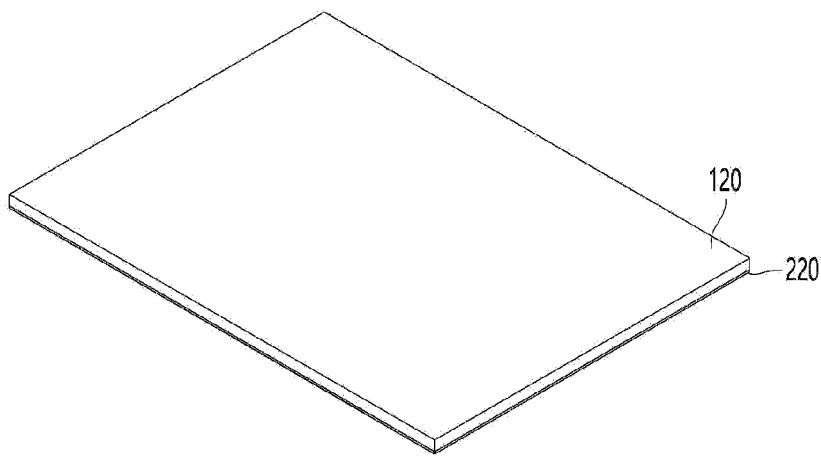
[FIG. 5]
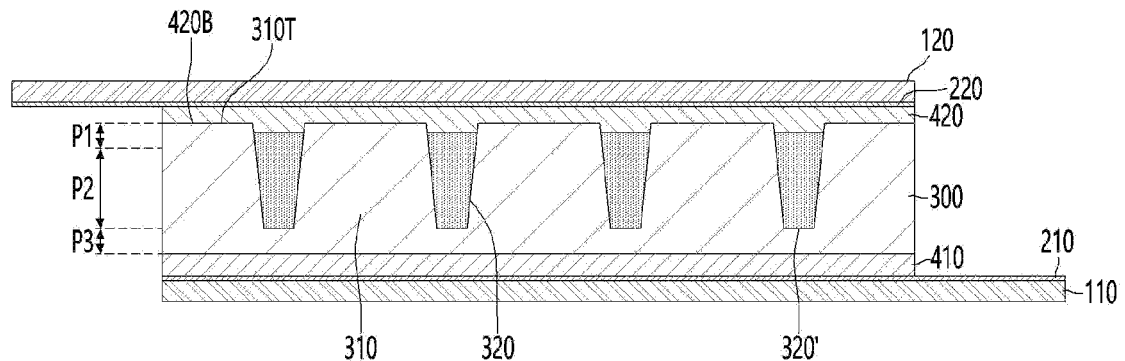

[FIG. 6]
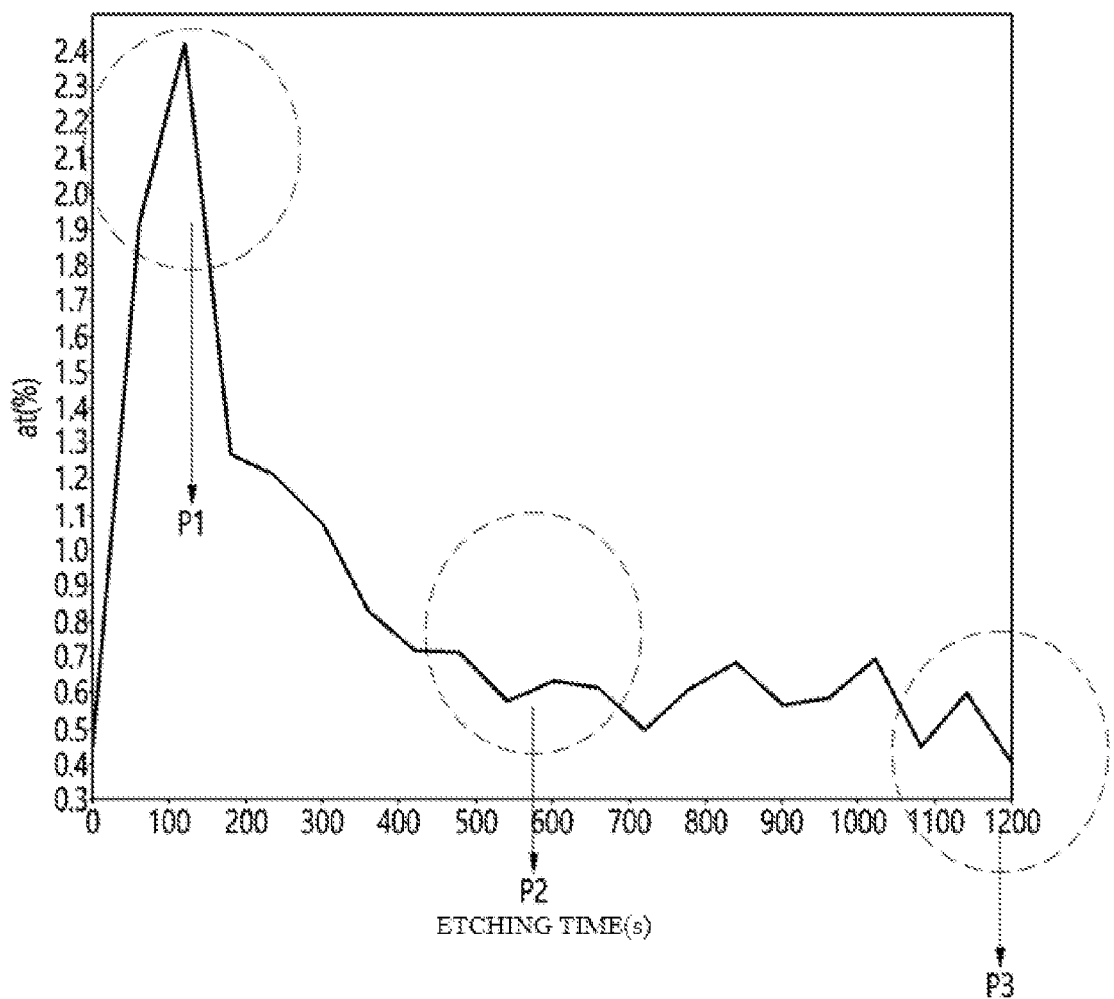

[FIG. 7]
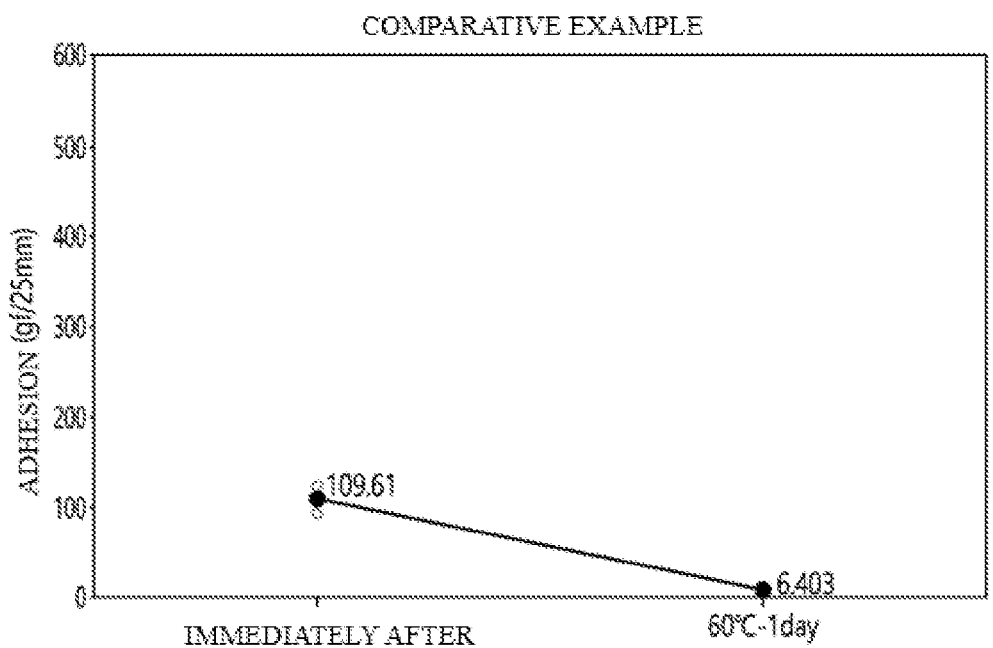
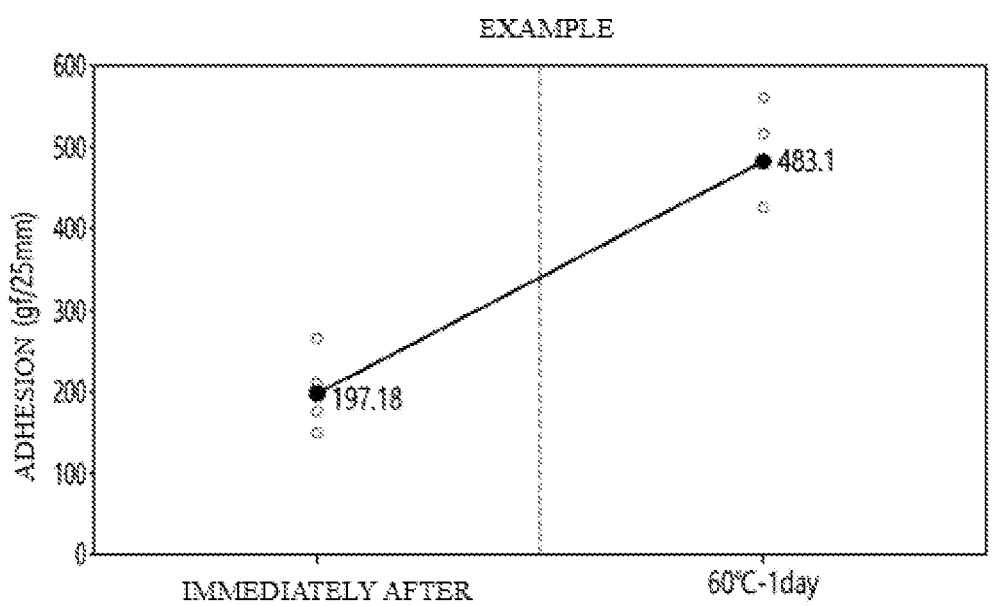

[FIG. 8]
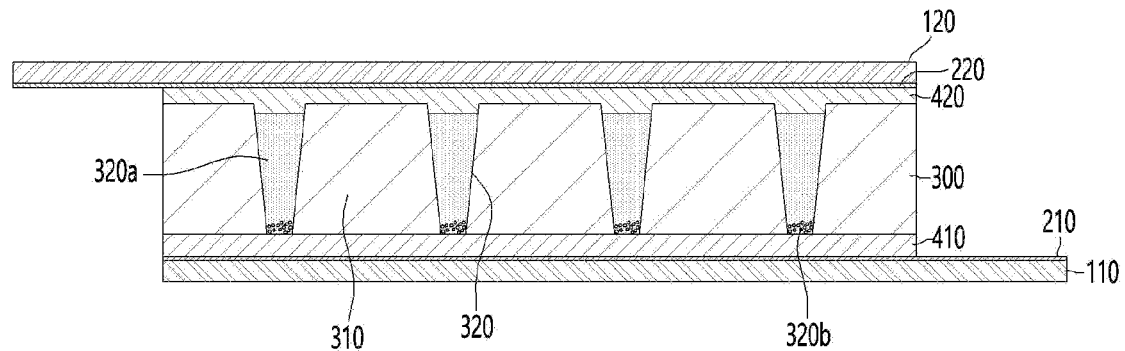
[FIG. 9]
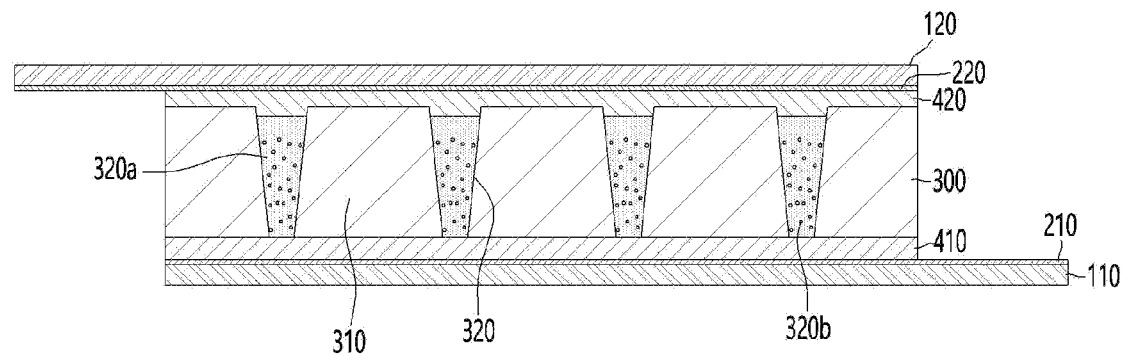
[FIG. 10]
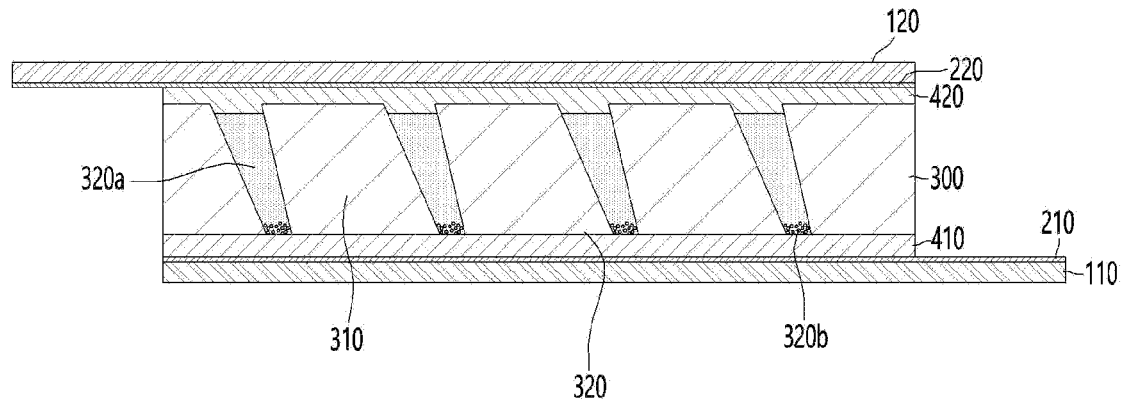

[FIG. 11]
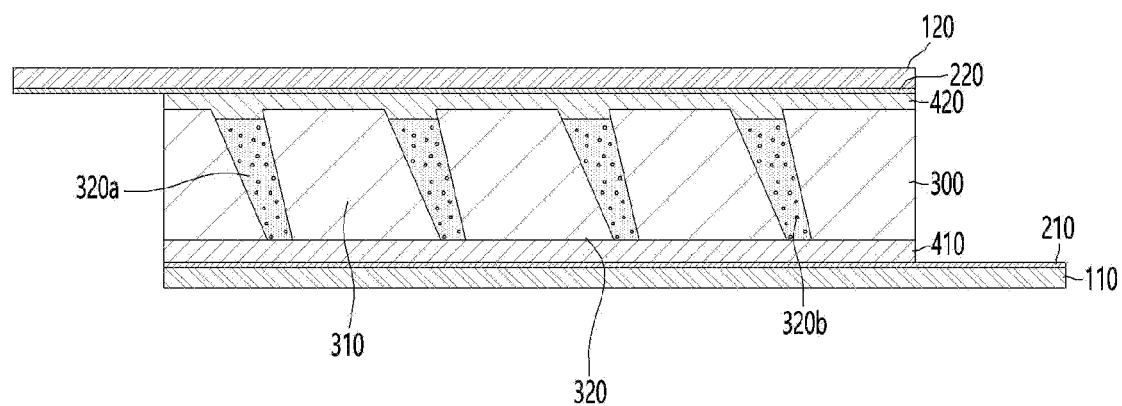
[FIG. 12]
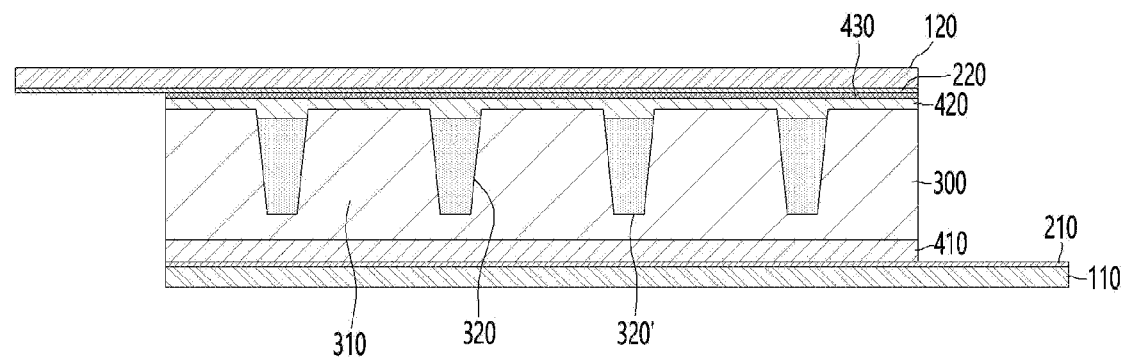

[FIG. 13]
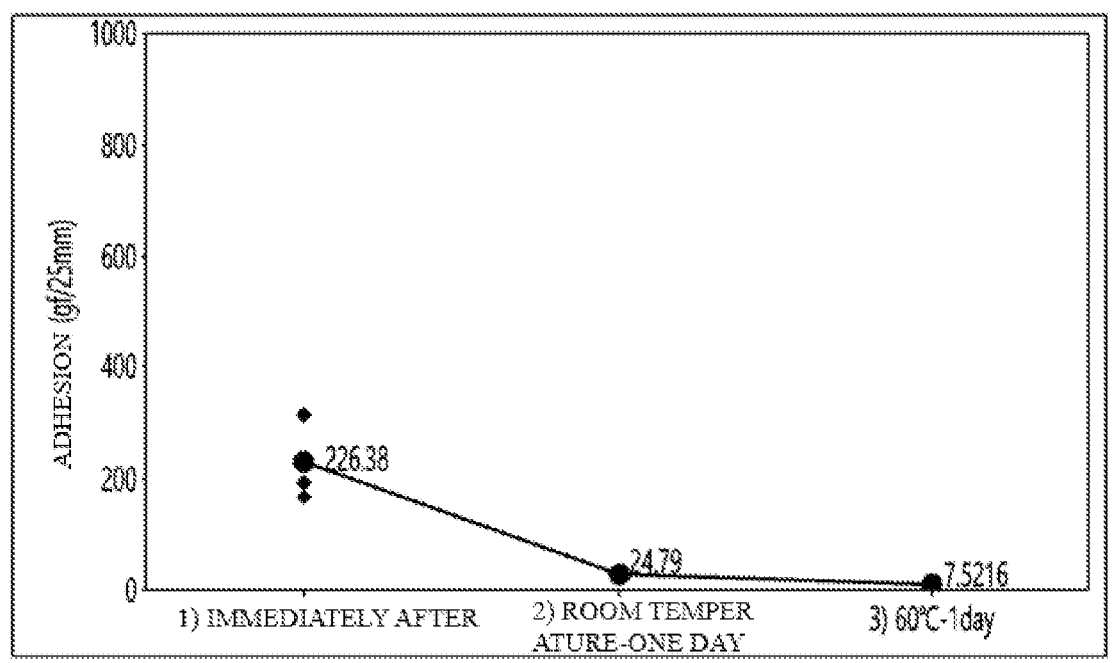

[FIG. 14]
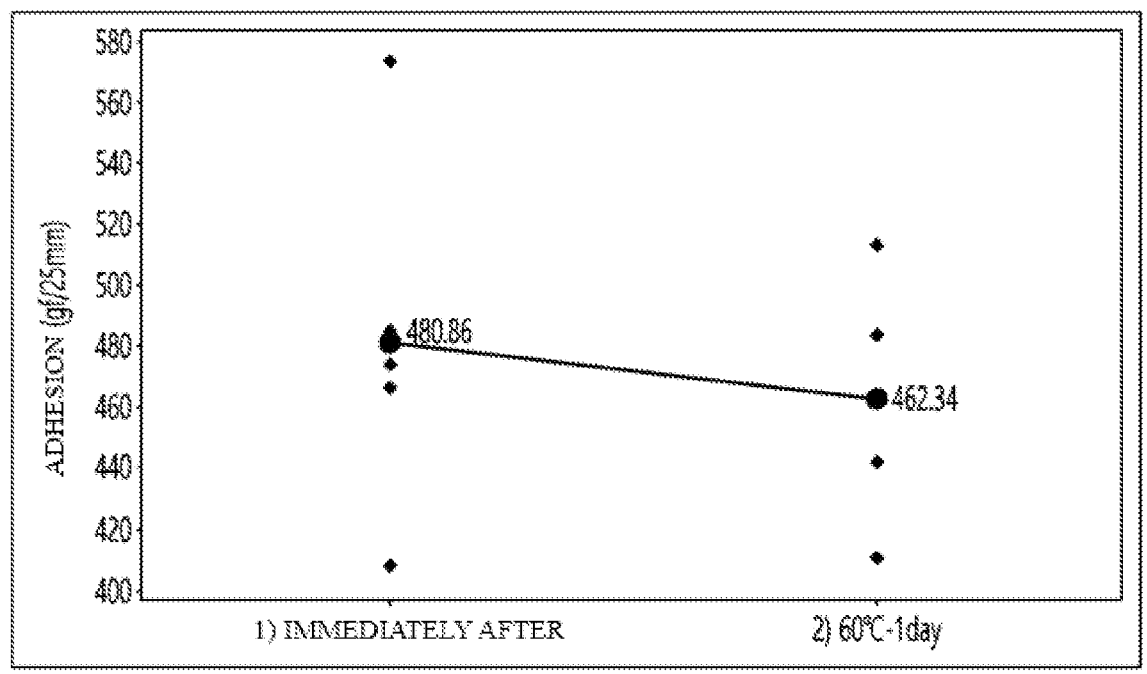
[FIG. 15]
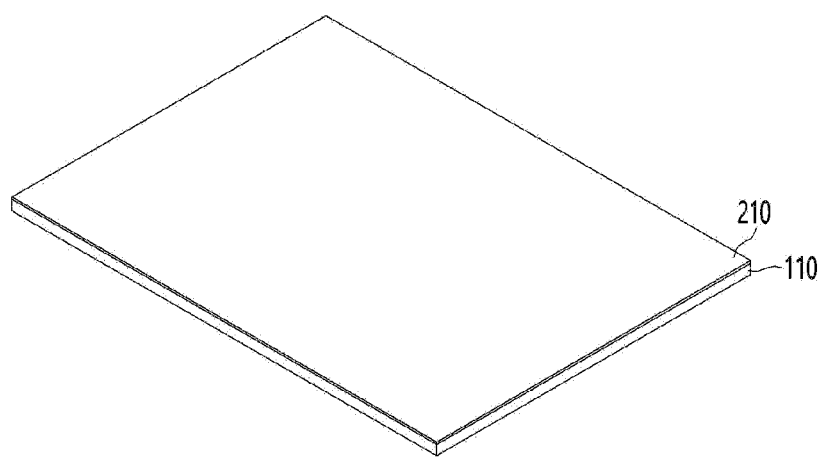

【FIG. 16】
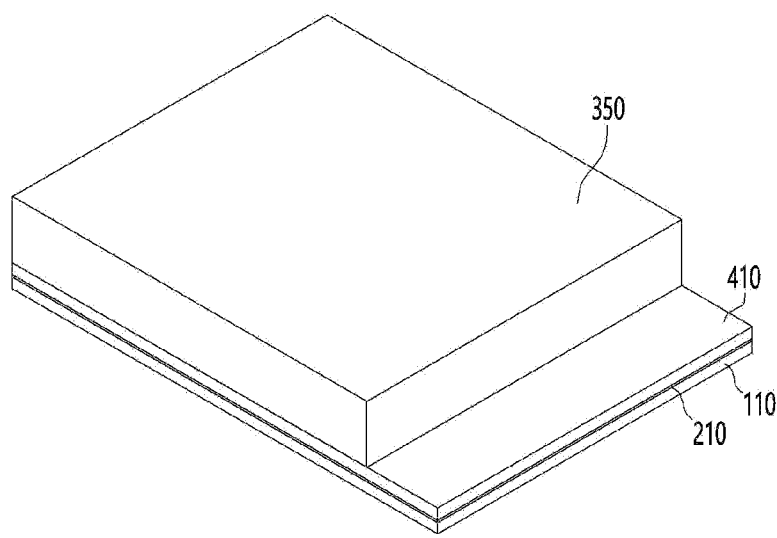
【FIG. 17】
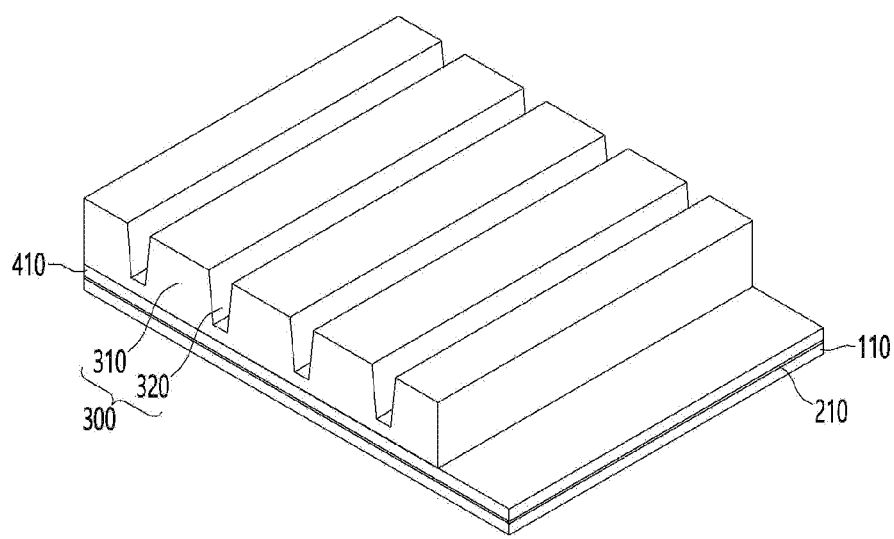

[FIG. 18]
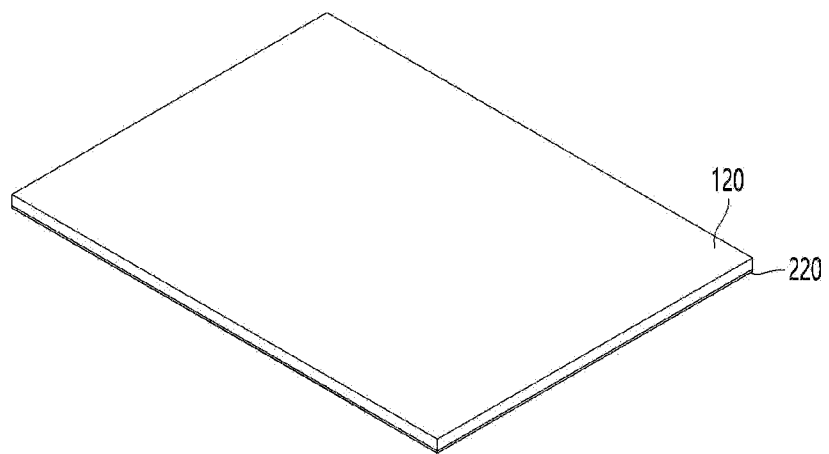

[FIG. 19]
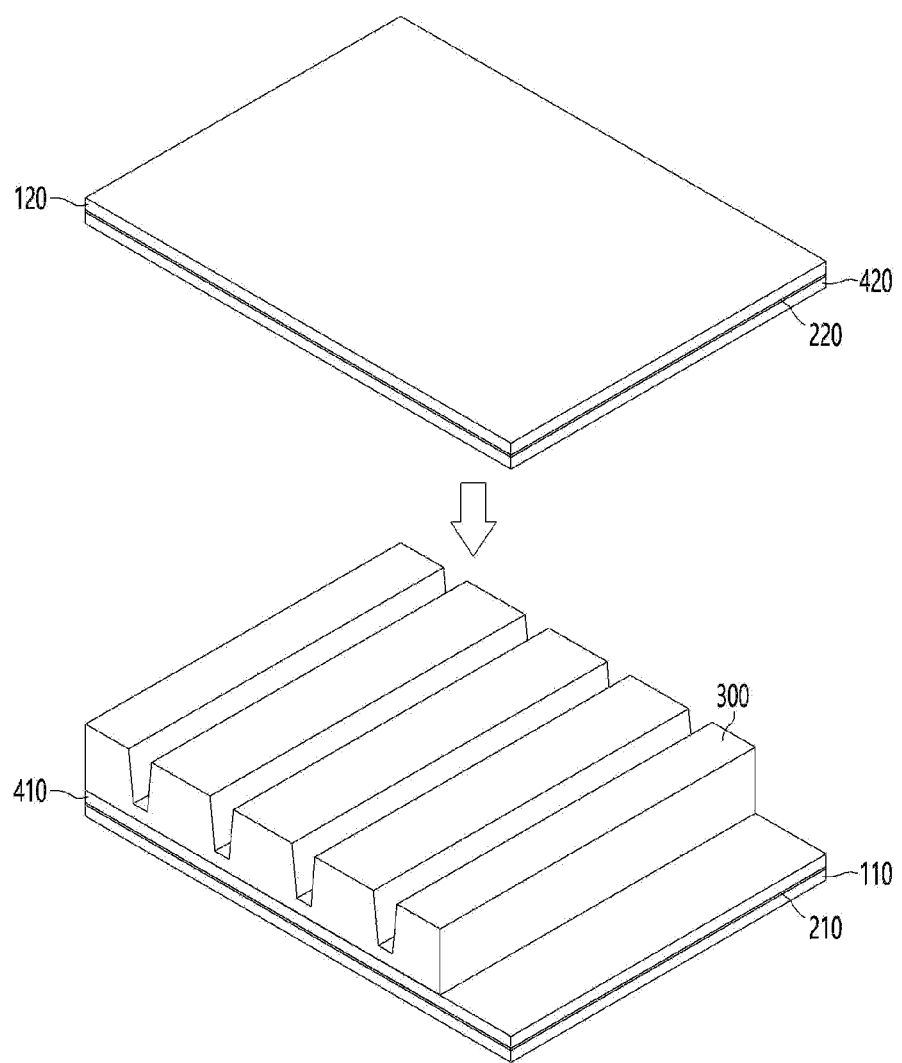

[FIG. 20]
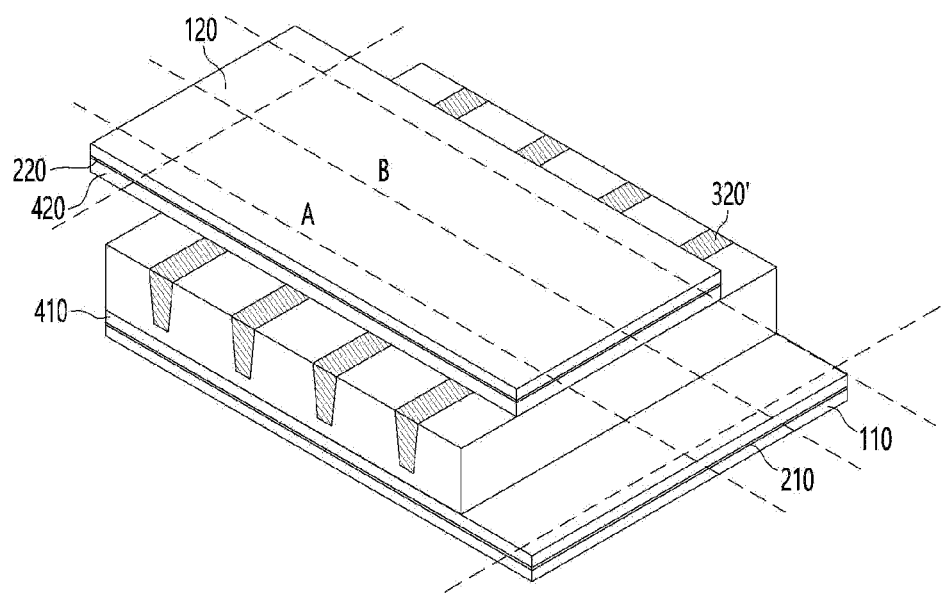
[FIG. 21]
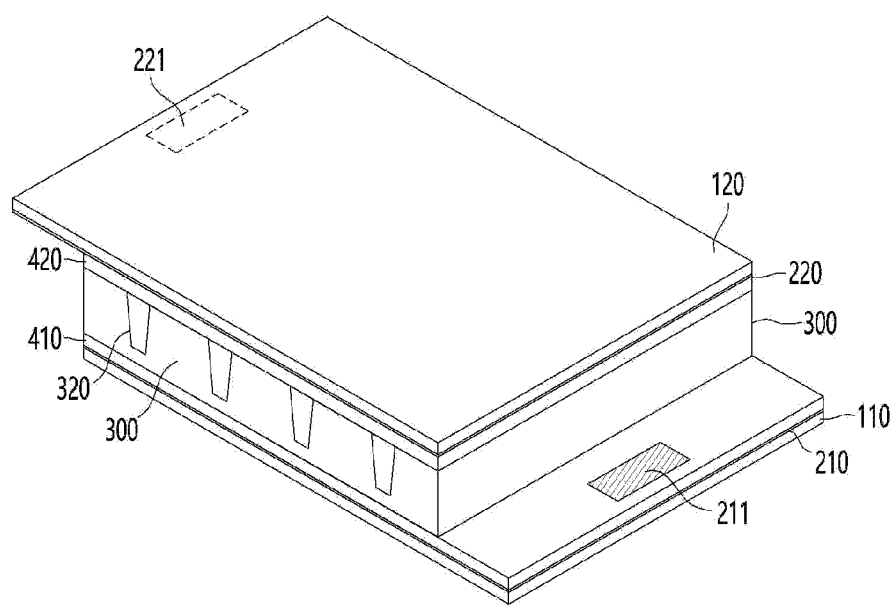

[FIG. 22]
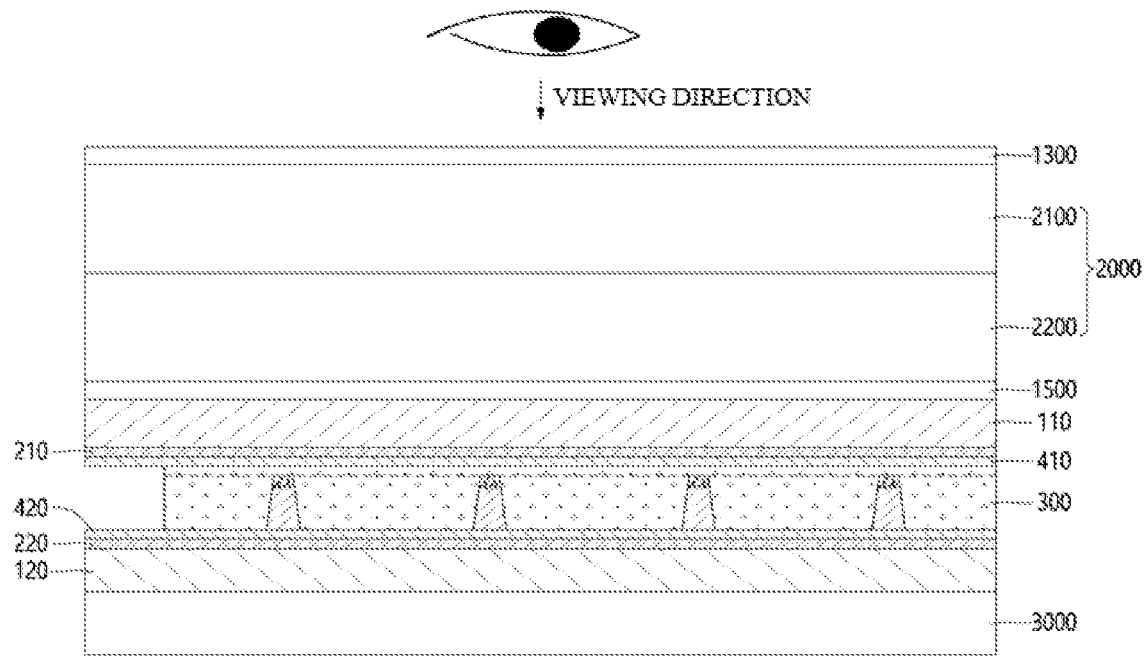
[FIG. 23]
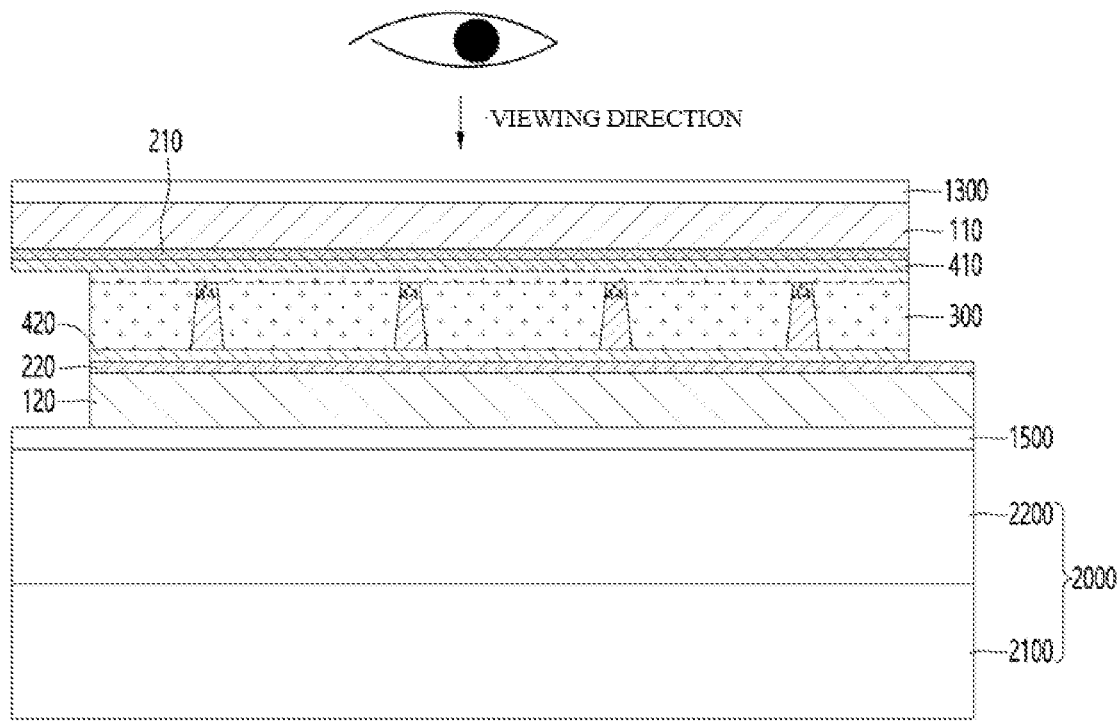

[FIG. 24]
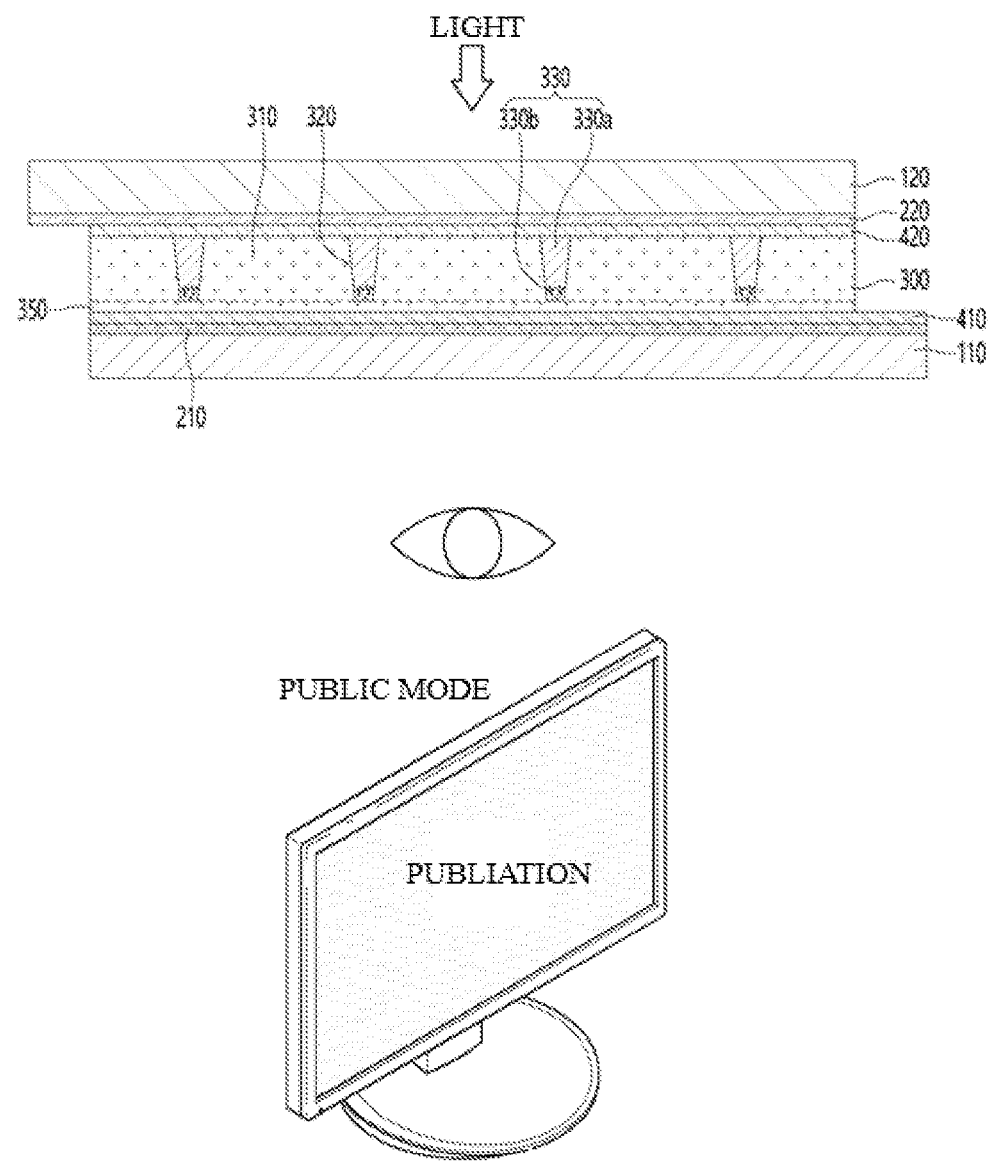

[FIG. 25]
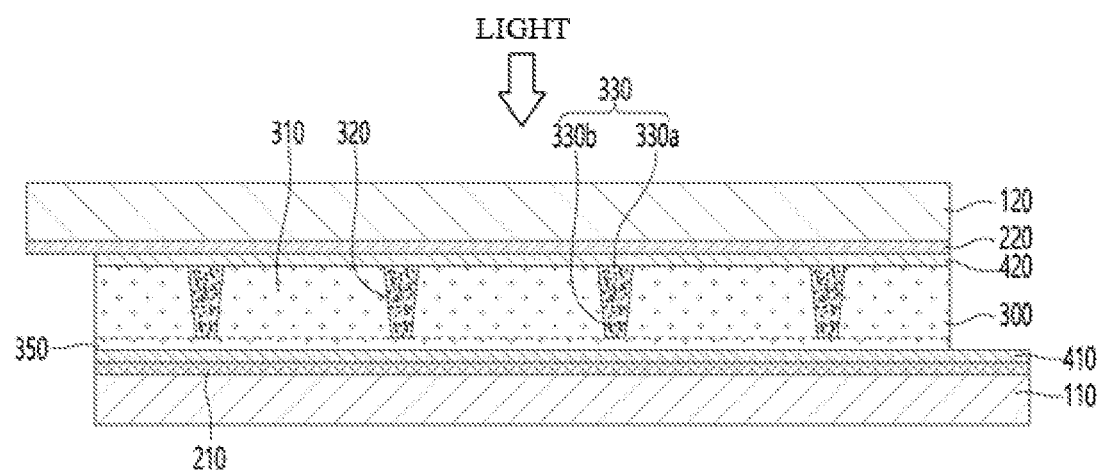
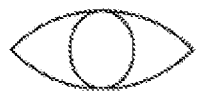
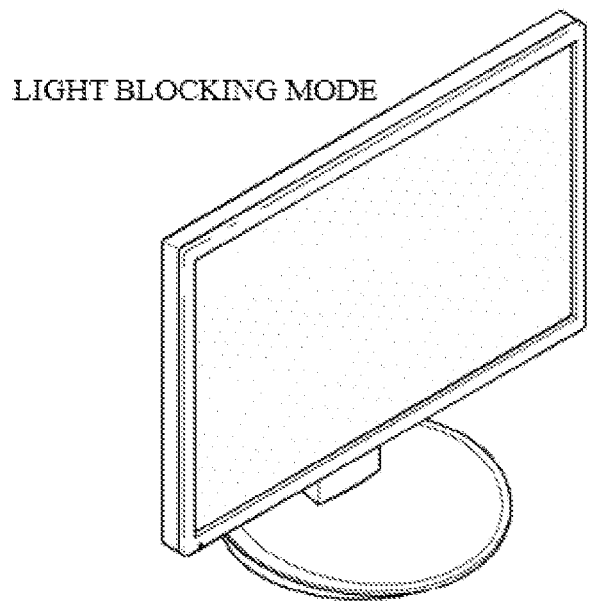

【FIG. 26】
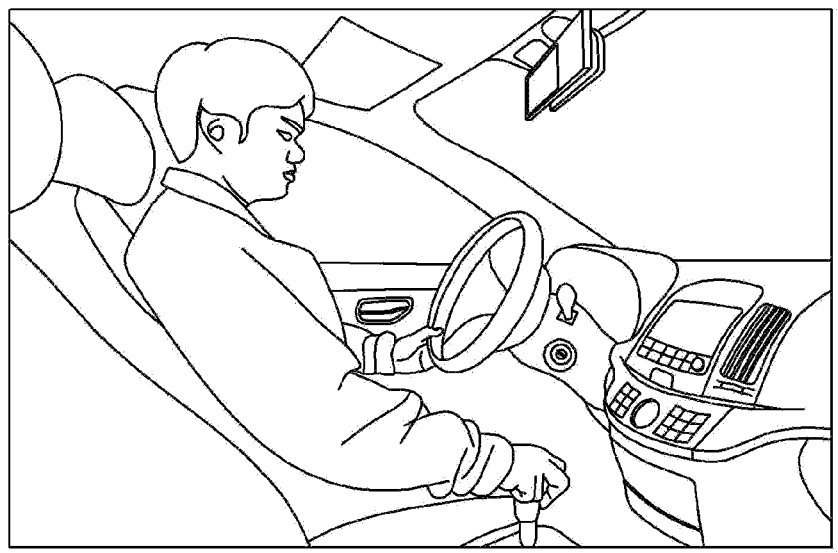

OPTICAL PATH CONTROL MEMBER AND DISPLAY DEVICE COMPRISING SAME

CROSS REFERENCE TO RELATED APPLICATIONS

This application is the National Phase of PCT International Application No. PCT/KR2021/004762, filed on Apr. 15, 2021, which claims priority under 35 U.S.C. 119(a) to Patent Application Nos. 10-2020-0054203, filed in Republic of Korea on May 7, 2020 and 10-2020-0056079, filed in Republic of Korea on May 11, 2020, all of which are hereby expressly incorporated by reference into the present application.

TECHNICAL FIELD

An embodiment relates to an optical path control member, and to a display device including the same.

BACKGROUND ART

A light blocking film blocks transmitting of light from a light source, and is attached to a front surface of a display panel which is a display device used for a mobile phone, a notebook, a tablet PC, a vehicle navigation device, a vehicle touch, etc., so that the light blocking film adjusts a viewing angle of light according to an incident angle of light to express a clear image quality at a viewing angle needed by a user when the display transmits a screen.

In addition, the light blocking film may be used for the window of a vehicle, building or the like to shield outside light partially to prevent glare, or to prevent the inside from being visible from the outside.

That is, the light blocking film may be an optical path control member that controls a movement path of light to block light in a specific direction and transmit light in a specific direction. Accordingly, it is possible to control the viewing angle of the user by controlling a transmission angle of the light by the light blocking film.

Meanwhile, such a light blocking film may be divided into a light blocking film that can always control the viewing angle regardless of the surrounding environment or the user's environment and a switchable light blocking film that allow the user to turn on/off the viewing angle control according to the surrounding environment or the user's environment.

Such a switchable light blocking film may be implemented by switching a pattern part to a light transmitting part and a light blocking part by filling the inside of the pattern part with particles that may move when a voltage is applied and a dispersion liquid for dispersing the particles and by dispersing and aggregating the particles.

In order to prevent overflow of a filler, a light conversion part having a partition wall part may be manufactured using a photo-curable resin. In this case, the photo-curable resin may include an additive for improving releasability or electrical characteristics. Such an additive may migrate over a surface of the resin, and thus there is a problem that optical characteristics of the resin may deteriorate over time and adhesion between the resin and an adhesive layer may be deteriorated.

Therefore, an optical path control member having a new structure capable of solving the above problems is required.

DISCLOSURE

Technical Problem

An embodiment relates to an optical path control member having improved reliability by improving adhesive properties. In addition, the embodiment may provide an optical path control member with improved optical characteristics.

Technical Solution

An optical path control member according to an embodiment includes: a first substrate; a first electrode disposed on the first substrate; a light conversion part disposed on the first electrode; a second substrate disposed on the first substrate; a second electrode disposed under the second substrate; and an adhesive layer disposed between the light conversion part and the second electrode, wherein the light conversion part includes a partition wall part and a reception part alternately disposed, the reception part has a light transmittance that changes according to application of a voltage, the adhesive layer includes a first interface between an upper surface of the adhesive layer and the second electrode and a second interface between a lower surface of the adhesive layer and the light conversion part, the partition wall part includes a first region from an upper surface of the partition wall part up to 30 μm toward the first substrate, a third region from a lower surface of the partition wall part up to 30 μm toward the second substrate, and a second region between the first region and the third region, and a content of Si measured by X-ray photoelectron spectroscopy (XPS) in the first region is 2 at % or less. A display device according to an embodiment includes: a display panel; and an optical path control member disposed on the display panel, wherein the optical path control member includes: a first substrate; a first electrode disposed on the first substrate; a light conversion part disposed on the first electrode; a second substrate disposed on the first substrate; a second electrode disposed under the second substrate; and an adhesive layer disposed between the light conversion part and the second electrode, wherein the light conversion part includes a partition wall part and a reception part alternately disposed, the reception part has a light transmittance that changes according to application of a voltage, the adhesive layer includes a first interface between an upper surface of the adhesive layer and the second electrode and a second interface between a lower surface of the adhesive layer and the light conversion part, the partition wall part includes a first region from an upper surface of the partition wall part up to 30 μm toward the first substrate, a third region from a lower surface of the partition wall part up to 30 μm toward the second substrate, and a second region between the first region and the third region, and a content of Si measured by XPS in the first region is 2 at % or less.

Advantageous Effects

An optical path control member according to an embodiment can improve adhesion and adhesion characteristics of an adhesive layer adhering a first substrate and a second substrate.

The embodiment may improve adhesion between a partition wall part and the adhesive layer by changing a composition of a photo-curable resin used in order to accommodate a light conversion material and prevent overflow of the light conversion material. In detail, the embodiment can reduce a content of an additive included in order to improve releasability or electrical characteristics of the photo-curable resin. Accordingly, the embodiment can prevent film removal or delamination between the partition wall part and the adhesive layer according to migration of the additive included in the resin.

In addition, the embodiment can prevent deterioration of optical characteristics due to migration of an additive in the photo-curable resin to a surface of the photo-curable resin over time. That is, the embodiment can prevent a change in haze over time.

DESCRIPTION OF DRAWINGS

FIGS. 1 and 2 are perspective views of an optical path control member according to an embodiment.

FIGS. 3 and 4 are a perspective view of a first substrate and a first electrode and a perspective view of a second substrate and a second electrode of the optical path control member according to the embodiment.

FIG. 5 is a cross-sectional view taken along line A-A' in FIG. 1.

FIG. 6 is a graph showing an XPS measurement result of Comparative Example.

FIG. 7 is a graph showing adhesion test results of Comparative Example and Example.

FIGS. 8 to 11 are cross-sectional views taken along line A-A' in FIG. 1 for describing shapes of various reception parts in an optical path control member according to an embodiment.

FIG. 12 is a cross-sectional view taken along line A-A' in FIG. 1 of an optical path control member according to another embodiment.

FIGS. 13 and 14 are graphs showing adhesion test results for each condition of Example and Comparative Example of an optical path control member according to another embodiment.

FIGS. 15 to 21 are views for describing a method of manufacturing an optical path control member according to an embodiment.

FIGS. 22 and 23 are cross-sectional views of a display device to which an optical path control member according to an embodiment is applied.

FIGS. 24 to 26 are views for describing one embodiment of the display device to which the optical path control member according to the embodiment is applied.

MODES OF THE INVENTION

Hereinafter, embodiments of the present invention will be described in detail with reference to the accompanying drawings. However, the spirit and scope of the present invention is not limited to a part of the embodiments described, and may be implemented in various other forms, and within the spirit and scope of the present invention, one or more of the elements of the embodiments may be selectively combined and replaced.

In addition, unless expressly otherwise defined and described, the terms used in the embodiments of the present invention (including technical and scientific terms) may be construed the same meaning as commonly understood by one of ordinary skill in the art to which this invention belongs, and the terms such as those defined in commonly used dictionaries may be interpreted as having a meaning that is consistent with their meaning in the context of the relevant art.

In addition, the terms used in the embodiments of the present invention are for describing the embodiments and are not intended to limit the present invention. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present invention, the terms such as first, second, A, B, (a), and (b) may be used. These terms are only used to distinguish the elements from other elements, and the terms are not limited to the essence, order, or order of the elements.

In addition, when an element is described as being "connected", or "coupled" to another element, it may include not only when the element is directly "connected" to, or "coupled" to other elements, but also when the element is "connected", or "coupled" by another element between the element and other elements.

Further, when described as being formed or disposed "on (over)" or "under (below)" of each element, the "on (over)" or "under (below)" may include not only when two elements are directly connected to each other, but also when one or more other elements are formed or disposed between two elements.

Furthermore, when expressed as "on (over)" or "under (below)", it may include not only the upper direction but also the lower direction based on one element.

Hereinafter, an optical path control member according to an embodiment will be described with reference to drawings. The optical path control member described below relates to a switchable optical path control member driven in various modes according to electrophoretic particles moving by application of a voltage.

Referring to FIGS. 1 to 4, an optical path control member 1000 according to an embodiment may include a first substrate 110, a second substrate 120, a first electrode 210, a second electrode 220, and a light conversion part 300.

The first substrate 110 may support the first electrode 210. The first substrate 110 may be rigid or flexible.

In addition, the first substrate 110 may be transparent. For example, the first substrate 110 may include a transparent substrate capable of transmitting light.

The first substrate 110 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS), which is only an example, but the embodiment is not limited thereto.

In addition, the first substrate 110 may be a flexible substrate having flexible characteristics.

Further, the first substrate 110 may be a curved or bended substrate. That is, the optical path control member including the first substrate 110 may also be formed to have flexible, curved, or bent characteristics. Accordingly, the optical path control member according to the embodiment may be changed to various designs.

The first substrate 110 may extend in a first direction 1A, a second direction 2A, and a third direction 3A.

In detail, the first substrate 110 may include the first direction 1A corresponding to a length or width direction of the first substrate 110, a second direction 2A extending in a direction different from the first direction 1A and corresponding to the length or width direction of the first substrate 110, and a third direction 3A extending in a direction different from the first direction 1A and the second direction 2A and corresponding to a thickness direction of the first substrate 110.

For example, the first direction 1A may be defined as the length direction of the first substrate 110, the second direction 2A may be defined as the width direction of the first substrate 110 perpendicular to the first direction 1A, and the third direction 3A may be defined as the thickness direction of the first substrate 110. Alternatively, the first direction 1A may be defined as the width direction of the first substrate 110, the second direction 2A may be defined as the length direction of the first substrate 110 perpendicular to the first direction 1A, and the third direction 3A may be defined as the thickness direction of the first substrate 110.

Hereinafter, for convenience of description, the first direction 1A will be described as the length direction of the first substrate 110, the second direction 2A will be described as the width direction of the first substrate 110, and the third directions 3A will be described as the thickness direction of the first substrate 110.

The first electrode 210 may be disposed on one surface of the first substrate 110. In detail, the first electrode 210 may be disposed on an upper surface of the first substrate 110. That is, the first electrode 210 may be disposed between the first substrate 110 and the second substrate 120.

The first electrode 210 may include a transparent conductive material. For example, the first electrode 210 may include a conductive material having a light transmittance of about 80% or more. As an example, the first electrode 210 may include a metal oxide such as indium tin oxide, indium zinc oxide, copper oxide, tin oxide, zinc oxide, titanium oxide, etc.

The first electrode 210 may have a thickness of 0.05 μm to 2 μm.

Alternatively, the first electrode 210 may include various metals to realize low resistance. For example, the first electrode 210 may include at least one metal of chromium (Cr), nickel (Ni), copper (Cu), aluminum (Al), silver (Ag), molybdenum (Mo). Gold (Au), titanium (Ti), and alloys thereof.

Referring to FIG. 3, the first electrode 210 may be disposed on the entire surface of one surface of the first substrate 110. In detail, the first electrode 210 may be disposed as a surface electrode on one surface of the first substrate 110. However, the embodiment is not limited thereto, and the first electrode 210 may be formed of a plurality of pattern electrodes having a uniform pattern such as a mesh or stripe shape.

For example, the first electrode 210 may include a plurality of conductive patterns. In detail, the first electrode 210 may include a plurality of mesh lines crossing each other and a plurality of mesh openings formed by the mesh lines.

Accordingly, even though the first electrode 210 includes a metal, the first electrode 210 is not visually recognized from the outside, so that visibility may be improved. In addition, the light transmittance is increased by the openings, so that the brightness of the optical path control member according to the embodiment may be improved.

The second substrate 120 may be disposed on the first substrate 110. In detail, the second substrate 120 may be disposed on the first electrode 210 on the first substrate 110.

The second substrate 120 may include a material capable of transmitting light. The second substrate 120 may include a transparent material. The second substrate 120 may include a material the same as or similar to that of the first substrate 110 described above.

For example, the second substrate 120 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS). This is only an example, but the embodiment is not limited thereto.

In addition, the second substrate 120 may be a flexible substrate having flexible characteristics.

Further, the second substrate 120 may be a curved or bended substrate. That is, the optical path control member including the second substrate 120 may also be formed to have flexible, curved, or bent characteristics. Accordingly, the optical path control member according to the embodiment may be changed to various designs.

The second substrate 120 may also extend in the first direction 1A, the second direction 2A, and the third direction 3A in the same manner as the first substrate 110 described above.

In detail, the second substrate 120 may include the first direction 1A corresponding to a length or width direction of the second substrate 120, the second direction 2A extending in a direction different from the first direction 1A and corresponding to the length or width direction of the second substrate 120, and the third direction 3A extending in the direction different from the first direction 1A and the second direction 2A and corresponding to the thickness direction of the second substrate 120.

For example, the first direction 1A may be defined as the length direction of the second substrate 120, the second direction 2A may be defined as the width direction of the second substrate 120 perpendicular to the first direction 1A, and the third direction 3A may be defined as the thickness direction of the second substrate 120.

Alternatively, the first direction 1A may be defined as the width direction of the second substrate 120, the second direction 2A may be defined as the length direction of the second substrate 120 perpendicular to the first direction 1A, and the third direction 3A may be defined as the thickness direction of the second substrate 120.

Hereinafter, for convenience of description, the first direction 1A will be described as the length direction of the second substrate 120, the second direction 2A the second direction 2A will be described as the width direction of the second substrate 120, and the third directions 3A will be described as the thickness direction of the second substrate 120.

The second electrode 220 may be disposed on one surface of the second substrate 120. In detail, the second electrode 220 may be disposed on a lower surface of the second substrate 120. That is, the second electrode 220 may be disposed on one surface of the second substrate 120 in which the second substrate 120 and the first substrate 110 face each other. That is, the second electrode 220 may be disposed to face the first electrode 210 on the first substrate 110. That is, the second electrode 220 may be disposed between the first electrode 210 and the second substrate 120.

The second electrode 220 may include a material the same as or similar to that of the first substrate 110 described above.

The second electrode 220 may include a transparent conductive material. For example, the second electrode 220 may include a conductive material having a light transmittance of about 80% or more. As an example, the second electrode 220 may include a metal oxide such as indium tin oxide, indium zinc oxide, copper oxide, tin oxide, zinc oxide, titanium oxide, etc.

The second electrode 220 may have a thickness of about 0.1 µm to about 0.5 µm.

Alternatively, the second electrode 220 may include various metals to realize low resistance. For example, the second electrode 220 may include at least one metal of chromium (Cr), nickel (Ni), copper (Cu), aluminum (Al), silver (Ag), molybdenum (Mo). gold (Au), titanium (Ti), and alloys thereof.

Referring to FIG. 4, the second electrode 220 may be disposed on the entire surface of one surface of the second substrate 120. In detail, the second electrode 220 may be disposed as a surface electrode on one surface of the second substrate 120. However, the embodiment is not limited thereto, and the second electrode 220 may be formed of a plurality of pattern electrodes having a uniform pattern such as a mesh or stripe shape.

For example, the second electrode 220 may include a plurality of conductive patterns. In detail, the second electrode 220 may include a plurality of mesh lines crossing each other and a plurality of mesh openings formed by the mesh lines.

Accordingly, even though the second electrode 220 includes a metal, the second electrode 220 is not visually recognized from the outside, so that visibility may be improved. In addition, the light transmittance is increased by the openings, so that the brightness of the optical path control member according to the embodiment may be improved.

The first substrate 110 and the second substrate 120 may have sizes corresponding to each other. The first substrate 110 and the second substrate 120 may have sizes the same as or similar to each other.

In detail, a first length extending in the first direction 1A of the first substrate 110 may have a size the same as or similar to a second length L2 extending in the first direction 1A of the second substrate 120.

For example, the first length and the second length may have a size of 300 mm to 400 mm.

In addition, a first width extending in the second direction 2A of the first substrate 110 may have a size the same as or similar to a second width extending in the second direction 2A of the second substrate 120.

For example, the first width and the second width may have a size of 150 mm to 200 mm.

In addition, a first thickness extending in the third direction 3A of the first substrate 110 may have a size the same as or similar to a second thickness extending in the third direction 3A of the second substrate 120.

For example, the first thickness and the second thickness may have a size of 30 µm to 200 µm.

Referring to FIG. 1, the first substrate 110 and the second substrate 120 may be disposed to be misaligned from each other.

In detail, the first substrate 110 and the second substrate 120 may be disposed at positions misaligned from each other in the first direction 1A. In detail, the first substrate 110 and the second substrate 120 may be disposed so that side surfaces of the substrates are misaligned from each other.

Accordingly, the first substrate 110 may be disposed to protrude in one direction in the first direction 1A, and the second substrate 120 may be disposed to protrude in the other direction in the second direction 2A.

That is, the first substrate 110 may include a first protrusion protruding in one direction in the first direction 1A, and the second substrate 110 may include a second protrusion protruding in the other direction in the first direction 1A.

Accordingly, the optical path control member 1000 may include a region where the first electrode 210 is exposed on the first substrate 110 and a region where the second electrode 220 is exposed under the second substrate 120.

That is, the first electrode 210 disposed on the first substrate 110 may be exposed at the first protrusion, and the second electrode 220 disposed under the second substrate 120 may be exposed at the second protrusion.

The first electrode 210 and the second electrode 220 exposed at the protrusions may be connected to an external printed circuit board through a connection portion that will be described below.

Alternatively, referring to FIG. 2, the first substrate 110 and the second substrate 120 may be disposed at positions corresponding to each other. In detail, the first substrate 110 and the second substrate 120 may be disposed so that each side surface corresponds to each other.

Accordingly, the first substrate 110 may be disposed to protrude in one direction of the first direction 1A, and the second substrate 120 may also be disposed to protrude in one direction of the first direction 1A, that is, in the same direction as the first substrate 110.

That is, the first substrate 110 may include the first protrusion protruding in one direction in the first direction 1A, and the second substrate may also include the second protrusion protruding in one direction in the first direction 1A.

That is, the first protrusion and the second protrusion may protrude in the same direction.

Accordingly, the optical path control member 1000 may include the region where the first electrode 210 is exposed on the first substrate 110 and the region where the second electrode 220 is exposed under the second substrate 120.

That is, the first electrode 210 disposed on the first substrate 110 may be exposed at the first protrusion, and the second electrode 220 disposed under the second substrate 120 may be exposed at the second protrusion.

The first electrode 210 and the second electrode 220 exposed at the protrusions may be connected to the external printed circuit board through the connection portion that will be described below.

The light conversion part 300 may be disposed between the first substrate 110 and the second substrate 120. In detail, the light conversion part 300 may be disposed between the first electrode 210 and the second electrode 220.

An adhesive layer or a buffer layer may be disposed between at least one of between the light conversion part 300 and the first substrate 110 or between the light conversion part 300 and the second substrate 120, and the first substrate 110, the second substrate 120, and the light conversion part 300 may be adhered to each other by the adhesive layer and/or the buffer layer.

The light conversion part 300 may include a plurality of partition wall parts and reception parts. Light conversion particles that move according to application of a voltage may be disposed in the reception part, and light transmission characteristics of the optical path control member may be changed by the light conversion particles.

A size of the light conversion part 300 may be smaller than a size of at least one of the first substrate 110 and the second substrate 120.

In detail, a length of the light conversion part 300 in the first direction may be smaller than a length of at least one of the first substrate 110 and the second substrate 120 in the first direction.

In addition, a width of the light conversion part 300 in the second direction may be the same as or smaller than a width of at least one of the first substrate 110 and the second substrate 120 in the second direction.

In addition, at least one of both ends of the first substrate 110 and the second substrate 120 in the first direction may be disposed outside both ends of the light conversion part 300 in the first direction.

Accordingly, a sealing portion (not shown in the drawing) may be easily disposed, and the adhesive properties of the sealing portion may be improved.

An optical path control member according to an embodiment will be described with reference to FIG. 5.

The optical path control member according to the embodiment may include a light conversion material. For example, the light conversion material 320' may be an EPD ink. In order to accommodate the light conversion material 320' and prevent overflow thereof, the light conversion part 300 may be used. The light conversion part 300 may include a reception part 320 for accommodating the light conversion material 320' and a partition wall part 310 for preventing the light conversion material 320' from overflowing.

The light conversion part 300 may be formed of a photo-curable resin. For example, the light conversion part 300 may be formed by imprinting the photo-curable resin. That is, the partition wall part 310 and the reception part 320 may be formed of the photo-curable resin.

In detail, the partition wall part 310 may include a resin material. For example, the partition wall part 310 may include a photo-curable resin material. As an example, the partition wall part 310 may include a urethane resin or the like.

The photo-curable resin may include an oligomer, a monomer, a photopolymerization initiator, and an additive. The photo-curable resin may form the light conversion part by reaction of a polymer-type prepolymer, a polyfunctional monomer as a diluent, and a photopolymerization initiator.

Here, the additive may refer to various materials for improving releasability or electrical characteristics of the photo-curable resin. For example, the additive may refer to various materials including a release additive and/or an antistatic agent.

The additive has a property of migrating to a surface of the resin over time. Such migration of the additive may cause a problem of deteriorating the optical characteristics of the optical path control member. In addition, the migration of the additive may deteriorate adhesion between the additive and the partition wall part.

In the embodiment, in order to reduce the migration of the additive, various factors such as a composition or constituent material of the photo-curable resin constituting the partition wall part may be changed.

The photo-curable resin may include a polymer backbone having a high crosslinking density. Here, the crosslinking density may be measured using a swelling method.

As the crosslinking density of the photo-curable resin increases, an amount of solvent molecules that may penetrate between the polymers. Accordingly, the higher the crosslinking density, the lower a swelling ratio (swelling %).

The swelling ratio may be calculated by the following equation.

$$\frac{1}{Q} = \frac{W_u}{W_s - W_u} = \frac{W_u}{W_{sol}} = \frac{\text{Weight of unswollen crosslinked material}}{\text{Weight of swelling solvent}}$$

Here, each function may refer to the following.
Q=swelling ratio
Ws=weight of swollen crosslinked material
Wu=weight of unswollen crosslinked material
Wsol=weight of swelling solvent The photo-curable resin according to the embodiment may have a swelling ratio of 10% or less.

When the swelling ratio of the photo-curable resin exceeds 10%, the crosslinking density is relatively low, so that the amount of solvent molecules that may penetrate between the polymers may increase. Accordingly, an amount of the additive that may penetrate between rubber chains of the photo-curable resin may be increased. Therefore, when the swelling ratio of the photo-curable resin exceeds 10%, adhesive properties and optical characteristics may be deteriorated.

That is, in the embodiment, the crosslinking density of the photo-curable resin, which is a material for forming the partition wall part, may be high. Therefore, the amount of penetration of the additive between the chains of the photo-curable resin may be small. Accordingly, the adhesion between the adhesive layer and the partition wall part in the optical path control member may be improved. In addition, the embodiment may prevent deterioration of the optical characteristics due to the migration of the additive in the photo-curable resin to the surface of the photo-curable resin over time. Accordingly, haze of the optical path control member may be improved.

The photo-curable resin may include a urethane acrylate polymer. For example, the oligomer may include urethane acrylate.

The monomer may have five or more branches. In the embodiment, as a number of functional groups of the monomer increases, crosslinking may be increased, and thus the crosslinking density may be increased.

The monomer may be a polyfunctional monomer. The polyfunctional monomer may have five or more branches of a functional group. Here, a number of branches may refer that a number of each branch connected to a main chain is five or more. As an example, the number of branches of the monomer may be five to seven. For example, the monomer may have five to six branches.

When the number of branches of the monomer is five or more, a chain length of the polymer is shortened and contracted, and thus the crosslinking density may be increased. The embodiment may include a monomer having five or more branches, so that the swelling ratio may have a value of 10% or less.

When the number of branches of the monomer is less than five, the crosslinking density of the polymer may be decreased. Accordingly, when the partition wall part is formed of a material having less than five branches of the monomer, there may be a problem that the adhesive properties and optical characteristics of the optical path control member are deteriorated.

When the photo-curable resin is 100 wt %, the additive may be included in an amount of 0.5 wt % or less. In the embodiment, since the additive in the photo-curable resin is included in the amount of 0.5 wt % or less, an amount of migration of the additive on the partition wall part may be reduced.

When the amount of the additive exceeds 0.5 wt %, there may be a problem that the additive may migrate to the surface of the photo-curable resin.

Here, the additive may include an antistatic agent and a non-reactive release additive having a form of a siloxane product.

For example, the non-reactive release additive may be a Si-containing material such as PDMS.

For example, the antistatic agent may be an F containing material.

In the embodiment, it can be confirmed that a content of the additive according to the position of the partition wall portion by measuring X-ray photoelectron spectroscopy (XPS) from an interface between an upper surface 310T of the partition wall portion and a lower surface 420B of the adhesive layer in a depth direction of the partition wall portion. Through an XPS device, it can be confirmed that the content of the additive in a region positioned inside for each thickness of the partition wall part.

As an example, while a surface of the partition wall part may be gradually etched by etching from an upper surface of the partition wall part, the content of the additive in the region positioned inside the partition wall part may be confirmed. When an etching time is short, a content of the additive in a first region may be confirmed, and when the etching time is long, a content of the additive in a third region may be confirmed.

For example, in the embodiment, while etching the upper surface of the partition wall part, the content of the additive positioned inside the partition wall part may be confirmed according to the etching time.

That is, when the etching time of the partition wall part is zero, a content of Si and F indicated on the surface of the partition wall part may be confirmed.

As an example, when the etching time of the partition wall part is less than about 300 seconds, the content of the additive included in the partition wall part in a region close to the surface of the partition wall part may be confirmed.

As an example, when the etching time of the partition wall part is about 300 seconds to 1000 seconds, the content of the additive included in the partition wall part in a middle portion of the partition wall part may be confirmed.

As an example, when the etching time of the partition wall part exceeds about 1000 seconds, the content of the additive included in the partition wall part in a base layer positioned close to a first electrode of the partition wall part may be confirmed.

The partition wall part 310 may be divided into a first region that is a surface portion of the resin, a second region that is an intermediate portion, and a third region that is a base layer portion according to a depth. In detail, the partition wall part may include a first region P1 from the upper surface 310T of the partition wall part up to 30 μm in the depth direction, a third region P3 from the lower surface of the partition wall part up to 30 μm in the depth direction, and a second region between the first region and the third region.

The partition wall part may include a first region P1 from the upper surface of the partition wall part up to 30 μm toward the first substrate, a third region P3 from the lower surface of the partition wall part up to 30 μm toward the second substrate, and a second region P2 between the first region and the third region. Accordingly, the partition wall part having various thickness ranges may include the first region, the second region, and the third region. Alternatively, the partition wall part may include the first region and the third region.

As an example, the second region P2 may be a region between 30 μm and 60 μm from the upper surface of the partition wall part in the depth direction. The third region P3 may include a region between 60 μm and 95 μm from the upper surface of the partition wall part in the depth direction.

Referring to FIGS. 5 and 6, a difference in a degree of migration of the additive in Comparative Example and Example will be described in detail.

Here, at % of Si may represent a content and degree of migration of the non-reactive release additive according to a position, and at % of F may represent a content and degree of migration of the antistatic agent.

FIG. 6 is a graph showing an XPS result for each depth of a partition wall part measured in Comparative Example.

The XPS result is a measurement of at % content of Si, and the content of Si contained in the additive may be an evaluation criterion capable of measuring the migration of Si.

In the XPS measurement result, an x-axis may represent an etching time, and a y-axis may represent at % of Si.

That is, the XPS measurement result may show a content of elements such as Si and F according to the depth of the partition wall part as the etching time elapses.

In Comparative Example, a content of Si in the first region P1 may be more than 2 at %.

In Comparative Example, a content of Si and F in the first region may be more than 2.6 at %.

In Comparative Example, it can be confirmed that the content of Si in the first region P1 is significantly higher than those of the second region P2 and the third region P3. That is, In Comparative Example, it can be confirmed that the amount of migration of the additive is large between an interface between the adhesive layer and the partition wall part.

Referring to FIG. 6, in Comparative Example, it can be confirmed that the content of Si measured in the first region P1 is greater than the content of Si measured in the second region P2 or the third region P3 by 1.5 at % or more.

According to a surface analysis result of the resin measured in Example, the content of Si measured on the surface of the partition wall part before etching may be less than 2.0 at %. For example, according to the surface analysis result of the resin measured in Example, the content of Si measured on the surface of the partition wall part before etching may be 1.5 at % or less.

For example, according to the surface analysis result of the resin in Example, the content of Si measured on the surface of the partition wall part before etching may be 1.3 at % to 1.4 at %. As an example, in Example, according to the surface analysis result of the resin, the content of Si measured on the surface of the partition wall part before etching may be 1.38 at % to 1.40 at %.

In Example, the content of Si measured by XPS in the first region may be 2 at % or less. For example, in Example, the content of Si measured by XPS in the first region may be 1.5 at % or less. For example, in Example, the content of Si measured by XPS in the first region may be 1 at % or less.

In Example, it can be confirmed that the content of Si in the first region P1 is at a level similar to those of the second region P2 and the third region P3. In addition, in Example, it can be confirmed that the content of F in the first region P1 is at a level similar to those of the second region P2 and the third region P3. In detail, in Example, it can be confirmed that the content of the additive is similar regardless of the depth of the partition wall part.

In Example, the content of Si and F may be constant in a region up to 30 μm from the upper surface of the partition wall part in the depth direction. In Example, the content of Si and F may be constant in a region up to 90 μm from the upper surface of the partition wall part in the depth direction. That is, in Example, it can be confirmed that the migration of the additive is small between the interface between the adhesive layer and the partition wall part.

In Example, the content of Si and F measured in the first region may be 1 at % to 3 at %. For example, in Example, the content of Si and F measured in the first region may be 1 at % to 2 at %. For example, in Example, the content of Si and F measured in the first region may be 2 at % to 2.6 at %.

In detail, in Example, it can be confirmed that a deviation between the content of Si in the first region P1 and the content of Si in the second region P2 is less than 1.5 at %. For example, in Example, it can be confirmed that the deviation between the content of Si in the first region P1 and the content of Si in the second region P2 is less than 1.0 at %. For example, in Example, it can be confirmed that the deviation between the content of Si in the first region P1 and the content of Si in the second region P2 is less than 0.5 at %.

In detail, in Example, it can be confirmed that a deviation between the content of Si in the first region P1 and the content of Si in the third region P3 is less than 1.5 at %. For example, in Example, it can be confirmed that the deviation of the content of Si in the first region P1 and the content of Si in the third region P3 is less than 1.0 at %. For example, in Example, it can be confirmed that the deviation between the content of Si in the first region P1 and the content of Si in the third region P3 is less than 0.5 at %.

In Example, results of the Si and F contents according to the depth of the partition wall part are as shown in Tables 1 and 2.

Table 1 shows the results when the partition wall part is etched for 60 seconds. In this case, when the partition wall part is etched for 60 seconds, contents of additives such as Si and F positioned in the first region may be confirmed.

In Table 1, it can be confirmed that a sum of the contents of Si and F in the first region when etching for 60 seconds is 2.53 at %.

TABLE 1

| Ingredient | at % |
| --- | --- |
| Si2p | 0.63 |
| P2p | 0.33 |
| S2p | 0.48 |
| C1s | 74.39 |
| In3d | 0.11 |
| O1s | 22.16 |
| F1s | 1.90 |

Table 2 shows the results when the partition wall part is etched for 1202 seconds. In this case, when the partition wall part is etched for 1202 seconds, the contents of additives such as Si and F positioned in the third region may be confirmed. In Table 2, it can be confirmed that a sum of the contents of Si and F in the third region when etching for 1202 seconds is 0.63 at %.

TABLE 2

| Ingredient | at % |
| --- | --- |
| C1s | 81.27 |
| O1s | 17.83 |
| Si2p | 0.22 |
| P2p | 0.15 |
| F1s | 0.41 |
| S2p | 0.13 |

Referring to Tables 1 and 2, in Example, it can be confirmed that a difference between contents of Si in the first region and the third region is 0.41 at %. Through this, it can be confirmed that the difference between the contents of Si in the first region and the second region is also less than 0.5 at %. In addition, in Example, it can be confirmed that a difference between contents of F in the first region and the third region is less than 1.5 at %. In Example, it can be confirmed that the difference between the contents of F in the first region and the second region is less than 1.5 at %.

When the crosslinking density is increased, a content of the additive migrating to the surface portion of the resin may be reduced.

Referring to FIG. 7, adhesion between the upper surface of the partition wall and the adhesive layer will be described in detail.

FIG. 7 shows adhesion test results in Example and Comparative Example.

In Example, a sample specimen having the same structure as in FIG. 5 was prepared for the adhesion test. A 180 degrees peel test in which the second substrate 120, which is the upper ITO substrate, was lifted from the sample specimen was performed. The 180 degrees peel test is a test of measuring how much force is applied to peel off the upper ITO substrate.

When the upper ITO substrate is lifted in the 180 degrees peel test, a peeled interface may be either an interface between the adhesive layer 420 and the second electrode 220 or an interface between the adhesive layer 420 and the partition wall part 310. In detail, when the upper ITO substrate is lifted in the 180 degrees peel test, the interface having lower adhesion will be peeled off among a first interface between the adhesive layer and an ITO electrode on the adhesive layer and a second interface between the adhesive layer and the resin under the adhesive layer.

In Comparative Example and Example, the peel test of an upper ITO substrate was performed twice, respectively.

First, after manufacturing the sample substrates according to Comparative Example and Example, the 180 degrees peel test in which the upper ITO substrate is lifted was performed at room temperature. Here, a meaning of after the sample substrate is manufactured may mean immediately after the resin layer, which is light conversion part positioned on a lower ITO substrate, and the upper ITO substrate are adhered by the adhesive layer 420. Here, a measurement value of the peel test immediately after the sample substrate is manufactured may be a value measured within 30 minutes from the preparation of the sample substrate. In this case, a standard of the value at which the upper ITO substrate is peeled off, measured at room temperature immediately after the sample substrate is manufactured, may mean when adhesion between the OCA adhesive layer and ITO (50 μm) is about 100 gf/25 mm.

In Comparative Example, the partition wall part may be made of a photo-curable resin using a polymer having a low crosslinking density. Accordingly, in Comparative Example, it can be seen that since the first interface between the adhesive layer 420 and the second electrode 220 is peeled off (109.6 gf/25 mm) immediately after the sample substrate is manufactured, adhesion of the second interface between the adhesive layer 420 and the light conversion part 300 is higher, and it may be estimated that the adhesion between the adhesive layer 420 and the light conversion part 300 has a value of greater than 109.6 gf/25 mm.

In Example, the partition wall part may be manufactured using a photo-curable resin using a polymer having a high crosslinking density. Accordingly, in Example, it can be seen that since the first interface between the adhesive layer 420 and the second electrode 220 is peeled off (197.2 gf/25 mm) immediately after the sample substrate is manufactured, the adhesion of the second interface between the adhesive layer 420 and the light conversion part 300 is higher, and it may be estimated that the adhesion between the adhesive layer 420 and the light conversion part 300 has a value greater than 197.2 gf/25 mm.

In Example, the adhesion of the first interface measured at room temperature immediately after the second electrode and the light conversion part are adhered by the adhesive layer may be 120 gf/25 mm or more. For example, in Example, the adhesion of the first interface measured at room temperature immediately after the second electrode and the light conversion part are adhered by the adhesive layer may be 150 gf/25 mm or more. For example, in Example, the adhesion of the first interface measured at room temperature immediately after the second electrode and the light conversion part are adhered by the adhesive layer may be 190 gf/25 mm or more. That is, unlike the Comparative Example, since Example includes a polymer having a high crosslinking density, the adhesion at the first interface may be 120 gf/25 mm or more.

In addition, in Example, the adhesion of the second interface measured at room temperature immediately after the second electrode and the light conversion part are adhered by the adhesive layer may be 120 gf/25 mm or more. For example, in Example, the adhesion of the second interface measured at room temperature immediately after the second electrode and the light conversion part are adhered by the adhesive layer may be 150 gf/25 mm or more. For example, in Example, the adhesion of the second interface measured at room temperature immediately after the second electrode and the light conversion part are adhered by the adhesive layer may be 190 gf/25 mm or more.

Next, after manufacturing the sample substrate according to Comparative Example and Example, the 180 degrees peeling test in which the upper ITO substrate is lifted was performed after 24 hours at 60° C. Here, in the sample substrate, the adhesion of the first interface between the adhesive layer and the second electrode may be increased under a condition of 60° C. higher than room temperature. Therefore, the peeling test was performed after aging at the condition of 60° C.

In Comparative Example, after manufacturing the sample substrate, the 180 degrees peeling test in which the upper ITO substrate is lifted was performed after 24 hours at the condition of 60° C. In this case, in the sample substrate of Comparative Example, it can be seen that since the second interface between the adhesive layer 420 and the light conversion part 300 is peeled off (6.4 gf/25 mm), the adhesion of the first interface between the adhesive layer 402 and the second electrode 220 is higher. In addition, in Comparative Example, the adhesion of the second interface between the adhesive layer 420 and the light conversion part 300 measured immediately after the sample substrate was manufactured was greater than 109.6 gf/25 mm, but it can be confirmed that the adhesion of the second interface between the adhesive layer 420 and the light conversion part 300 is greatly reduced to 6.4 gf/25 mm due to the additive migrating over a surface of the light conversion part (resin) for 24 hours at the condition of 60° C.

In Example, after manufacturing the sample substrate, the 180 degrees peeling test in which the upper ITO substrate is lifted was performed after 24 hours at the condition of 60° C. In this case, in the sample substrate of Example, it can be seen that since the second interface between the adhesive layer 420 and the light conversion part 300 is peeled off (483 gf/25 mm), the adhesion of the first interface between the adhesive layer 402 and the second electrode 220 is higher.

In addition, in Example, the adhesion of the second interface between the adhesive layer 420 and the light conversion part 300 measured immediately after the sample substrate was manufactured was greater than 197.2 gf/25 mm, and it can be confirmed that since an amount of the additive migrating over the surface of the light conversion part (resin) for 24 hours at the condition of 60° C. decreases, the adhesion of the second interface between the adhesive layer 420 and the light conversion part 300 is increased in 483 gf/25 mm, which is higher than immediately after the sample substrate is manufactured, or an existing adhesion is maintained.

In Example, after the second electrode and the light conversion part is adhered by the adhesive layer, the adhesion of the second interface measured after 24 hours at 60° C. may be 300 gf/25 mm or more. For example, in Example, after the second electrode and the light conversion part is adhered by the adhesive layer, the adhesion of the second interface measured after 24 hours at 60° C. may be 300 gf/25 mm or more.

In Example, after the second electrode and the light conversion part is adhered by the adhesive layer, the adhesion of the second interface measured after 24 hours at 60° C. may be 400 gf/25 mm or more.

For example, in Example, after the second electrode and the light conversion part is adhered by the adhesive layer, the adhesion of the second interface measured after 24 hours at 60° C. may be 450 gf/25 mm or more. For example, in Example, after the second electrode and the light conversion part is adhered by the adhesive layer, the adhesion of the second interface measured after 24 hours at 60° C. may be 480 gf/25 mm or more.

That is, in Example, it is possible to prevent the migration of the additive over time after adhesion, thereby preventing a decrease in the adhesion between the partition wall part and the adhesive layer.

In Example, it can be confirmed that the adhesion between the light conversion part and the adhesive layer is improved through the 180 degrees peel test. That is, in Example, it can be seen that the migration of the additive included in the light conversion part is reduced, so that the adhesion of the second interface positioned between the light conversion part which is a resin material and the adhesive layer is excellent. Accordingly, the reliability of the optical path control member according to Example may be improved.

Details of the light conversion part 300 will be described in detail below.

Referring to FIGS. 5, 8 to 11, the light conversion part 300 may include a partition wall part 310, and a reception part 320.

The partition wall part 310 may be defined as a partition wall part dividing the reception part. That is, the partition wall part 310 may transmit light as a barrier region dividing a plurality of reception parts. In addition, the reception part 320 may be defined as a variable region where the reception part 320 is switched to a light blocking part and a light transmitting part according to application of a voltage.

The partition wall part 310 and the reception part 320 may be alternately disposed with each other. The partition wall part 310 and the reception part 320 may be disposed to have different widths. For example, a width of the partition wall part 310 may be greater than that of the reception part 320.

The partition wall part 310 and the reception part 320 may be alternately disposed with each other. In detail, the partition wall part 310 and the reception part 320 may be alternately disposed with each other. That is, each of the partition wall parts 310 may be disposed between the reception parts 320 adjacent to each other, and each of the reception parts 320 may be disposed between the adjacent partition wall parts 310.

The partition wall part 310 may include a transparent material. The partition wall part 310 may include a material that may transmit light.

The partition wall part 310 may transmit light incident on any one of the first substrate 110 and the second substrate 120 toward another substrate.

For example, in FIGS. 8 to 11, light may be emitted from the first substrate 110 by a light source disposed under the first substrate 110, and the light may be incident toward the second substrate 120. In this case, the partition wall part 310 may transmit the light, and the transmitted light may move toward the second substrate 120.

The reception part 320 may include the dispersion liquid 320a and the light conversion particles 320b. In detail, the reception part 320 may be filled by injecting the dispersion liquid 320a. A plurality of light conversion particles 320b may be dispersed in the dispersion liquid 320a.

The dispersion liquid 320a may be a material for dispersing the light conversion particles 320b. The dispersion liquid 320a may include a transparent material. The dispersion liquid 320a may include a non-polar solvent.

In addition, the dispersion liquid 320a may include a material capable of transmitting light. For example, the dispersion liquid 320a may include at least one of a halocarbon-based oil, a paraffin-based oil, and isopropyl alcohol.

The light conversion particles 320b may be disposed to be dispersed in the dispersion liquid 320a. In detail, the plurality of light conversion particles 320b may be disposed to be spaced apart from each other in the dispersion liquid 320a.

The light conversion particles 320b may include a material capable of absorbing light. That is, the light conversion particles 320b may be light absorbing particles. The light conversion particles 320b may have a color. For example, the light conversion particles 320b may have a black-based color. As an example, the light conversion particles 320b may include carbon black.

The light conversion particles 320b may have a polarity by charging a surface thereof. For example, the surface of the light conversion particles 320b may be charged with a negative (−) charge. Accordingly, according to the application of the voltage, the light conversion particles 320b may move toward the first electrode 210 or the second electrode 220.

The light transmittance of the reception part 320 may be changed by the light conversion particles 320b. In detail, the reception part 320 may be switched to the light blocking part and the light transmitting part by changing the light transmittance due to the movement of the light conversion particles 320b. That is, the reception part 320 may change the transmittance of light passing through the reception part 320 by dispersion and aggregation of the light conversion particles 320b disposed inside the dispersion liquid 320a.

For example, the optical path control member according to the embodiment may be converted from a first mode to a second mode or from the second mode to the first mode by a voltage applied to the first electrode 210 and the second electrode 220.

In detail, in the optical path control member according to the embodiment, the reception part 320 becomes the light blocking part in the first mode, and light of a specific angle may be blocked by the reception part 320. That is, a viewing angle of the user viewing from the outside is narrowed, so that the optical path control member may be driven in a privacy mode.

In addition, in the optical path control member according to the embodiment, the reception part 320 becomes the light transmitting part in the second mode, and in the optical path control member according to the embodiment, light may be transmitted through both the partition wall part 310 and the reception part 320. That is, the viewing angle of the user viewing from the outside may be widened, so that the optical path control member may be driven in a public mode.

Switching from the first mode to the second mode, that is, the conversion of the reception part 320 from the light blocking part to the light transmitting part may be realized by movement of the light conversion particles 320b of the reception part 320. That is, the light conversion particles 320b may have a charge on the surface thereof and may move toward the first electrode or the second electrode according to the application of a voltage according to characteristics of the charge. That is, the light conversion particles 320b may be electrophoretic particles In detail, the reception part 320 may be electrically connected to the first electrode 210 and the second electrode 220.

In this case, when a voltage is not applied to the optical path control member from the outside, the light conversion particles 320b of the reception part 320 are uniformly dispersed in the dispersion liquid 320a, and the reception part 320 may block light by the light conversion particles. Accordingly, in the first mode, the reception part 320 may be driven as the light blocking part.

Alternatively, when a voltage is applied to the optical path control member from the outside, the light conversion particles 320b may move. For example, the light conversion particles 320b may move toward one end or the other end of the reception part 320 by a voltage transmitted through the first electrode 210 and the second electrode 220. That is, the light conversion particles 320b may move from the reception part 320 toward the first electrode 210 or the second electrode 220.

In detail, when a voltage is applied to the first electrode 210 and/or the second electrode 220, an electric field is formed between the first electrode 210 and the second electrode 220, and the light conversion particles 320b charged with the negative charge may move toward a positive electrode of the first electrode 210 and the second electrode 220 using the dispersion liquid 320a as a medium.

That is, when the voltage is applied to the first electrode 210 and/or the second electrode 220, as shown in FIG. 8, the light conversion particles 320b may move toward the first electrode 210 in the dispersion liquid 320a. That is, the light conversion particles 320b may move in one direction, and the reception part 320 may be driven as the light transmitting part.

Alternatively, when the voltage is not applied to the first electrode 210 and/or the second electrode 220, as shown in FIG. 9, the light conversion particles 320b may be uniformly dispersed in the dispersion liquid 320a to drive the reception part 320 as the light blocking part.

Accordingly, the optical path control member according to the embodiment may be driven in two modes according to a user's surrounding environment. That is, when the user requires light transmission only at a specific viewing angle, the reception part is driven as the light blocking part, or in an environment in which the user requires high brightness, a voltage may be applied to drive the reception part as the light transmitting part.

Therefore, since the optical path control member according to the embodiment may be implemented in two modes according to the user's requirement, the optical path control member may be applied regardless of the user's environment.

Meanwhile, the reception part may be disposed in a different shape in consideration of driving characteristics and the like.

Referring to FIGS. 8 and 9, in an optical path control member according to another embodiment, both ends of a reception part 320 may be disposed in contact with a buffer layer 410 and an adhesive layer 420 unlike FIG. 5.

For example, a lower portion of the reception part 320 may be disposed in contact with the buffer layer 410, and an upper portion of the reception part 320 may be disposed in contact with the adhesive layer 420.

Accordingly, a distance between the reception part 320 and the first electrode 210 may be reduced, so that the voltage applied from the first electrode 210 may be smoothly transmitted to the reception part 320.

Accordingly, a moving speed of the light conversion particles 320b inside the reception part 320 may be improved, and thus the driving characteristics of the optical path control member may be improved.

In addition, referring to FIGS. 10 and 11, in an optical path control member according to an embodiment, unlike FIGS. 8 and 9, a reception part 320 may be disposed to have a constant inclination angle θ.

In detail, referring to FIGS. 10 and 11, the reception part 320 may be disposed to have an inclination angle θ of greater than 0° to less than 90° with respect to the first substrate 110. In detail, the reception part 320 may extend upward while having an inclination angle θ of greater than 0° to less than 90° with respect to one surface of the first substrate 110.

Accordingly, when the optical path control member is used together with a display panel, moire caused by an overlapping phenomenon between a pattern of the display panel and the reception part 320 of the optical path control member may be alleviated, thereby improving user visibility.

Hereinafter, an optical path control member according to another embodiment will be described with reference to FIGS. 12 to 14. In the description of the optical path control member according to another embodiment, descriptions of the same as or similar to those of the optical path control member according to the embodiment described above will be omitted, and the same reference numerals are assigned to the same configurations.

In the optical path control member according to another embodiment, a polymer material layer may be disposed between the adhesive layer and the electrode in order to reduce the migration of the above-described additive.

Referring to FIG. 12, the optical path controlling member according to another embodiment may include the polymer material layer disposed on the first electrode 210 or the second electrode 220.

Referring to FIG. 12, the first electrode 210 may be disposed on the first substrate 110, and the buffer layer 410 defined as a first polymer material layer may be disposed on the first electrode 210. The second electrode 220 may be disposed on the second substrate 120, and a second polymer material layer 430 may be disposed on the second electrode 220.

The first polymer material layer and the second polymer material layer 430 may be the same as or different from each other.

The first polymer material layer may improve adhesive properties between the first electrode 210 and the light conversion part 300 formed of a resin. In detail, the first polymer material layer 410 is positioned between the first electrode 210 and the light conversion part 300, so that deterioration in adhesive properties caused by a difference in surface energy of different materials may be alleviated.

The second polymer material layer 430 may improve the adhesion between the second electrode 220 and the adhesive layer 420. In detail, the second polymer material layer 430 is positioned between the second electrode 220 and the adhesive layer 420, so that deterioration in adhesive properties due to a difference in surface energy of different materials may be alleviated.

At least one of the first polymer material layer and the second polymer material layer 430 may have a high surface energy on a surface of a transparent electrode film and may be a material capable of coating a thin film at a high density. For example, at least one of the first polymer material layer and the second polymer material layer 430 may include polyurethane acrylate. The polyurethane acrylate may coat a thin film at a high density. Accordingly, it is possible to prevent the release additive from migrating to an interface between the polymer and ceramic and an interface between the polymer and the metal.

At least one of the first polymer material layer and the second polymer material layer 430 may be a coating layer obtained by curing polyurethane acrylate for 24 hours or more at 50° C. to 80° C. In order to prevent the release additive from migrating within the polymer material layer of at least one of the first polymer material layer and the second polymer material layer 430, the coating layer may be manufactured by curing the polyurethane acrylate for 24 hours or more at 50° C. to 80° C. Accordingly, the first polymer material layer may have high adhesion to the light conversion part 300 which is a resin layer. That is, as the release additive in the resin layer migrates, it is possible to prevent interfacial separation between the light conversion part 300 and the first electrode 210. In addition, the second polymer material layer 430 may have high adhesion to the adhesive layer 420. That is, the second polymer material layer 430 may be positioned between the adhesive layer 420 and the second electrode 220 to prevent peeling of the adhesive layer 420 and the second electrode 220 by the release additive.

The second polymer material layer 430 may be in contact with the second electrode 220. An upper surface of the second polymer material layer 430 may be in direct contact with the second electrode 220. For example, the second polymer material layer 430 may include a third interface between the upper surface of the second polymer material layer 430 and the second electrode 220. The third interface may not include an additive. That is, the third interface between the upper surface of the second polymer material layer 430 and the second electrode 220 may not include a release additive migrated from the partition wall part, so that the second polymer material layer 430 and the second electrode 220 may have excellent adhesion properties. For example, the third interface may include the additive in an amount of 0.1% or less. For example, the third interface may include the additive in an amount of 0.05% or less. For example, the third interface may include the additive in an amount of 0.01% or less. Accordingly, adhesion between the second polymer material layer 430 and the second electrode 220 at the third interface may be excellent.

Meanwhile, when the polymer material layer is formed by rapidly curing at a high temperature, the denseness may be reduced. For example, when the polymer material layer is cured at 80° C. or more and/or less than 24 hours, the release additive may pass through the polymer material layer. Accordingly, the second polymer material layer may not prevent peeling between the second electrode and the adhesive layer.

The first polymer material layer and the second polymer material layer 430 according to the embodiment may be simultaneously manufactured, so that process efficiency may be improved. For example, the first polymer material layer and the second polymer material layer 430 according to the embodiment may include the same material. Accordingly, the first polymer material layer and the second polymer material layer 430 may be formed by entirely disposing the polymer material layer on the transparent electrode film at the same time.

At least one of the first polymer material layer and the second polymer material layer 430 according to the embodiment may be a high-density polymer material layer. For example, at least one of the first polymer material layer and the second polymer material layer 430 may include a polymer material layer having a high crosslinking density. Here, the high density may be determined through a Kel density which is the crosslinking density.

At least one of the first polymer material layer and the second polymer material layer 430 may have a Kel density (Kel fraction) of 90% or more. For example, at least one of the first polymer material layer and the second polymer material layer 430 may have a Kel density of 95% or more. When at least one of the first polymer material layer and the second polymer material layer 430 has a Kel density of 90% or less, it may be difficult to prevent the migration of the release additive because the crosslinking density is low.

The first polymer material layer may include a material having a higher density than a material layer used as a general buffer layer. For example, the first polymer material layer may be a polymer material layer having a higher crosslinking density than a material layer used as a general buffer layer. Accordingly, it may have an additional effect of preventing the migration of the release additive in addition to improving adhesion between existing heterogeneous interfaces. Therefore, in the embodiment, an initial adhesion may be continuously maintained by the first polymer material layer.

In addition, the second polymer material layer 430 may prevent a problem that the release additive passes through the adhesive layer made of OCA. For example, the second polymer material layer 430 may be positioned between the adhesive layer and the upper transparent electrode film. That is, in the embodiment, the second polymer material layer 430 may be disposed between the adhesive layer and the upper transparent electrode film without directly adhering the adhesive layer and the upper transparent electrode film. Accordingly, it is possible to solve a problem that the release additive passes through the adhesive layer and peels off between the adhesive layer and the upper transparent electrode film. That is, in the embodiment, as the second polymer material layer 430 is disposed, the release additive may not be positioned on an interface between the second polymer material layer 430 and an electrode positioned on the second polymer material layer 430, and thus the adhesion may be improved.

Table 1 shows test results of transmittance, surface resistance, and adhesion according to a thickness of the polymer material layer. The adhesion described in Table 1 may refer to adhesion between the second electrode and the second polymer material layer or adhesion between the first polymer material layer and the partition wall part.

At least one of the first polymer material layer and the second polymer material layer 430 may have a thickness of 300 nm to 1500 nm. For example, at least one of the first polymer material layer and the second polymer material layer 430 may have a thickness of 400 nm to 1000 nm. For example, at least one of the first polymer material layer and the second polymer material layer 430 may have a thickness of 400 nm to 800 nm.

For example, when the thickness of the second polymer material layer 430 is less than 300 nm, the second polymer material layer 430 may not prevent migration of the release additive from migrating to a surface of the second electrode 220, and thus the adhesion between the second electrode 220 and the adhesive layer 420 may be reduced.

For example, when the thickness of the second polymer material layer 430 is 1500 nm or more, as the surface resistance increases, the driving characteristics of the optical path control member may be deteriorated. In detail, when the thickness of the second polymer material layer 430 exceeds 1500 nm, the surface resistance may exceed 7.5 ($\times 10^{10} \Omega/\square$), and thus the driving characteristics may be deteriorated.

TABLE 3

| Thickness of polymer material layer (nm) | 200 | 500 | 800 | 1500 |
|---|---|---|---|---|
| Transmittance (%) | 93 | 93 | 93 | 92.5 |
| Surface resistance ($\times 10^{10}$ $\Omega/\square$) | 5.4 | 5.5 | 6 | 7.5 |
| Adhesion (kgf/25 mm) | 0.3 | 0.5 | 0.6 | 0.7 |

Adhesive properties of Example and Comparative Example of an optical path control member according to another embodiment will be described with reference to FIGS. 13 and 14.

FIGS. 13 and 14 are adhesion test results measured through a peel test in which the second substrate on which the second electrode is disposed is lifted 180 degrees.

FIG. 13 is a graph showing of an adhesion test result for each condition according to Comparative Example.

Referring to FIG. 13, in Comparative Example, the interface between the partition wall part and the adhesive layer immediately after adhering has an adhesion of about 226 gf/25 mm, but there is a problem that as the release additive positioned inside the partition wall migrates to an interface between the adhesive layer and an upper electrode, the interface between the adhesive layer and the upper electrode is peeled off over time. That is, in Comparative Example, the adhesive layer and the second electrode may be peeled off over time.

FIG. 14 is a graph showing an adhesion test result for each condition according to Example.

In this case, a thickness of a primer layer of Example is 500 nm and polyurethane acrylate is used.

Referring to FIG. 14, in Example, the interface between the adhesive layer and the partition wall part was peeled off in the 180 degrees peel test measured immediately after adhesion and after a certain time has elapsed, respectively.

In Example, the adhesive layer includes a first interface between an upper surface of the adhesive layer and the second polymer material layer and a second interface between a lower surface of the adhesive layer and the light conversion part, and adhesion of the first interface and the second interface measured at room temperature immediately after the polymer material layer and the light conversion part are adhered by the adhesive layer is 300 gf/25 mm or more, and after the second polymer material layer and the light conversion part are adhered by the adhesive layer, adhesion of the first interface and the second interface measured after 24 hours at 60° C. is 300 gf/25 mm or more.

In detail, in Example, the adhesive layer includes the first interface between the upper surface of the adhesive layer and the second polymer material layer and the second interface between the lower surface of the adhesive layer and the light conversion part, and the adhesion of the first interface and the second interface measured at room temperature immediately after the polymer material layer and the light conversion part are adhered by the adhesive layer is 400 gf/25 mm or more, and after the second polymer material layer and the light conversion part are adhered by the adhesive layer, the adhesion of the first interface and the second interface measured after 24 hours at 60° C. is 400 gf/25 mm or more.

In Example, the adhesive layer includes the first interface between the upper surface of the adhesive layer and the second polymer material layer and the second interface between the lower surface of the adhesive layer and the light conversion part, and the adhesion of the first interface and the second interface measured at room temperature immediately after the polymer material layer and the light conversion part are adhered by the adhesive layer is 450 gf/25 mm or more, and after the second polymer material layer and the light conversion part are adhered by the adhesive layer, the adhesion of the first interface and the second interface measured after 24 hours at 60° C. is 450 gf/25 mm or more.

That is, in Example, since the second interface is peeled off in each test measured immediately after adhesion and one day after adhesion, it can be seen that the adhesion of the first interface is 480 gf/25 mm or more immediately after adhesion, and 460 gf/25 mm or more after 24 hours at 60° C.

When a thickness of the polymer material layer having a Kel fraction of 95% or more is 500 nm or more, initial adhesion may be maintained by preventing the migration of the release additive. and in a graph example, since the initial adhesion between the adhesive layer and the partition wall is 400 gf/25 mm or more, the adhesion of 400 gf/25 mm or more may be maintained even after time has elapsed.

Meanwhile, in case of a polymer material layer having a Kel fraction of 90% to 95%, a thickness of 800 nm or more may be required.

Hereinafter, a method of manufacturing an optical path control member according to an embodiment will be described with reference to FIGS. 15 to 21.

Referring to FIG. 15, a first substrate 110 and an electrode material for forming a first electrode are prepared. Then, the first electrode may be formed by coating or depositing the electrode material on one surface of the first substrate. In detail, the electrode material may be formed on the entire surface of the first substrate 110. Accordingly, the first electrode 210 formed as a surface electrode may be formed on the first substrate 110.

Subsequently, referring to FIG. 16, a resin layer 350 may be formed by coating a resin material on the first electrode 210. In detail, the resin layer 350 may be formed by applying a urethane resin or an acrylic resin on the first electrode 210.

In this case, before disposing the resin layer 350, a buffer layer 410 may be additionally disposed on the first electrode 210. In detail, by disposing the resin layer 350 on the buffer layer 410 after disposing the buffer layer 410 having good adhesion to the resin layer 350 on the first electrode 210, it is possible to improve the adhesion of the resin layer 350.

For example, the buffer layer 410 may include an organic material including a lipophilic group such as —CH—, an alkyl group, etc. Having good adhesion to the electrode and a hydrophilic group such as —NH, —OH, —COOH, etc. Having a good adhesion to the resin layer 410.

The resin layer 350 may be disposed on a partial region of the first substrate 110. That is, the resin layer 350 may be disposed in an area smaller than that of the first substrate 110. Accordingly, a region where the resin layer 350 is not disposed and the first electrode 210 is exposed may be formed on the first substrate 110. In addition, when the buffer layer 410 is disposed on the first electrode 210, a region where the buffer layer 410 is exposed may be formed.

In detail, a size of a third length extending in the first direction of the resin layer 350 may be less than a size of a first length extending in the first direction of the first substrate 110, and a size of a third width extending in the second direction may be less than or equal to a size of a first width extending in the second direction of the first substrate 110.

That is, a length of the resin layer 350 may be smaller than a length of the first substrate 110, and a width of the resin layer 350 may be equal to or smaller than a width of the first substrate 110.

Subsequently, referring to FIG. 17, the resin layer 350 may be patterned to form a plurality of partition wall parts 310 and a plurality of reception parts 320 in the resin layer 350. In detail, an engraved portion may be formed in the resin layer 350 to form an engrave-shaped reception part 320 and the emboss-shaped partition wall part 310 between the engraved portions.

Accordingly, a light conversion part 300 including the partition wall part 310 and the reception part 320 may be formed on the first substrate 110.

In addition, the buffer layer 410 exposed on the first electrode 210 may be removed to expose the first electrode 210 in a region where the first substrate 110 protrudes.

Subsequently, referring to FIG. 18, a second electrode and an electrode material for forming a second substrate 120 and are prepared. Then, the second electrode may be formed by coating or depositing the electrode material on one surface of the second substrate.

In detail, the electrode material may be formed on the entire surface of the second substrate 120. Accordingly, the second electrode 220 formed as a surface electrode may be formed on the second substrate 120.

A size of the second substrate 120 may be smaller than that of the first substrate 110. In addition, the size of the second substrate 120 may be smaller than that of the resin layer 350.

In detail, a size of a second length extending in a first direction of the second substrate 120 may be greater than the third length extending in the first direction of the resin layer 350, and a size of a second width extending in a second direction of the second substrate 120 may be smaller than the size of the third width extending in the second direction of the resin layer 350.

Subsequently, referring to FIG. 19, an adhesive layer 420 may be formed by coating an adhesive material on the second electrode 220. In detail, a light-transmitting adhesive layer capable of transmitting light may be formed on the second electrode 220. For example, the adhesive layer 420 may include an optical transparent adhesive layer OCA.

The adhesive layer 420 may be disposed on a partial region of the light conversion part 300. That is, the adhesive layer 420 may be disposed in an area smaller than that of the light conversion part 300. Accordingly, a region where the adhesive layer 410 is not disposed and the light conversion part 300 is exposed may be formed on the light conversion part 300.

In detail, a size of a fourth length extending in a first direction of the adhesive layer 420 may be greater than a size of a third length extending in a first direction of the light conversion part 300, and a size of a fourth width extending in a second direction of the adhesive layer 420 may be smaller than a size of a third width extending in a second direction of the light conversion part 300.

Subsequently, referring to FIG. 20, the first substrate 110 and the second substrate 120 may be adhered. In detail, the second substrate 120 may be disposed on the light conversion part 300, and the second substrate 120 and the light conversion part 300 may be adhered through the adhesive layer 420 disposed under the second substrate 120.

Accordingly, the first substrate 110, the light conversion part 300, and the second substrate 120 may be sequentially stacked in the thickness direction of the first substrate 110, the light conversion part 300, and the second substrate 120.

In this case, since the second substrate 120 is disposed in a size smaller than the size of the resin layer 350, a plurality of partition wall parts 310 and reception parts 320 may be exposed in a region where the second substrate 120 is not disposed on the light conversion part 300.

In detail, since the size of the second width extending in the second direction of the second substrate 120 is smaller than the size of the third width extending in the second direction of the resin layer 350, the plurality of partition walls 310 and the reception part 320 may be exposed in an end region of at least one of one end and the other end facing in a width direction of the resin layer 350.

Subsequently, a light conversion material 380 may be injected between the partition wall parts 310, that is, the reception parts 320. In detail, a light conversion material in which light absorbing particles such as carbon black are dispersed in an electrolyte solvent including a paraffinic solvent and the like may be injected between the partition wall parts, that is, the reception parts 320.

For example, after disposing a dam extending in a longitudinal direction of the light conversion part 300 on the reception part and the partition wall part of the light conversion part 300 on which the second substrate 120 is not disposed, the electrolyte solvent may be injected into the reception part 320 by a capillary injection method between the dam and a side surface of the light conversion part 300.

Subsequently, referring to FIG. 21, one optical path control member may be manufactured by cutting the light conversion part 300. In detail, the light conversion part 300 may be cut in a longitudinal direction of the light conversion part 300.

That is, the light conversion part 300, the buffer layer 410 under the light conversion part 300, the first electrode 210, and the first substrate 110 may be cut along the dotted line shown in FIG. 21. A plurality of optical path control members A and B may be formed by the cutting process, and FIG. 23 is a view showing one of the plurality of optical path control members.

In detail, the light conversion part 300 may be cut so that side surfaces of the first substrate 110, the second substrate 120, and the light conversion part 300 in the width direction may be disposed on the same plane.

Accordingly, both ends of the second substrate 120, the second electrode 220, or the adhesive layer 420 in the second direction and both ends of the light conversion part 300 in the second direction may be disposed on the same plane.

That is, the both ends of the adhesive layer 420 in the second direction and the both ends of the light conversion part 300 in the second direction may be connected to each other.

Alternatively, the both ends of the second substrate 120, the second electrode 220, or the adhesive layer 420 in the second direction may be disposed more outside than the both ends of the light conversion part 300 in the second direction according to an error during the process.

Subsequently, the buffer layer 410 disposed on the first substrate 110 and/or the adhesive layer 420 disposed under the second substrate 120 may be partially removed to form a connection portion in which the electrode is exposed.

In detail, when the buffer layer 410 is disposed on the first electrode where the light conversion part 300 is not disposed on an upper surface of the first substrate 110, a first connection portion 211 may be formed on the first substrate 110 by removing a part of the first buffer layer 410 to expose the first electrode 210 or by not disposing the buffer layer 410 on the first electrode on which the light conversion unit 300 is not disposed from the beginning. In addition, when the adhesive layer 420 is disposed on the second electrode where the light conversion part 300 is not disposed on a lower surface of the second substrate 120, a second connection portion 221 may be formed under the second substrate 120 by removing a part of the adhesive layer 420 or by not disposing the adhesive layer on the second electrode on which the light conversion part 300 is not disposed during the adhesive process.

A printed circuit board or a flexible printed circuit board may be connected to the connection portions through an anisotropic conductive film (ACF) or the like, and the printed circuit board may be connected to an external power source to apply a voltage to the optical path control member.

Hereinafter, referring to FIGS. 22 to 26, a display device to which an optical path control member according to an embodiment is applied will be described.

Referring to FIGS. 22 and 23, an optical path control member 1000 according to an embodiment may be disposed on or under a display panel 2000.

The display panel 2000 and the optical path control member 1000 may be disposed to be adhered to each other. For example, the display panel 2000 and the optical path control member 1000 may be adhered to each other via an adhesive layer 1500. The adhesive layer 1500 may be transparent. For example, the adhesive layer 1500 may include an adhesive or an adhesive layer including an optical transparent adhesive material.

The adhesive layer 1500 may include a release film. In detail, when adhering the optical path control member and the display panel, the optical path control member and the display panel may be adhered after the release film is removed.

Meanwhile, referring to FIGS. 22 and 23, one end or one end and the other end of the optical path control member may protrude, and the light conversion part may not be disposed at the protruding portion. The protrusion region is an electrode connection portion in which the first electrode 210 and the second electrode 220 are exposed, and may connect an external printed circuit board and the optical path control member through the electrode connection portion.

The display panel 2000 may include a first' substrate 2100 and a second' substrate 2200. When the display panel 2000 is a liquid crystal display panel, the optical path control member may be formed under the liquid crystal panel. That is, when a surface viewed by the user in the liquid crystal panel is defined as an upper portion of the liquid crystal panel, the optical path control member may be disposed under the liquid crystal panel. The display panel 2000 may be formed in a structure in which the first' substrate 2100 including a thin film transistor (TFT) and a pixel electrode and the second' substrate 2200 including color filter layers are bonded to each other with a liquid crystal layer interposed therebetween.

In addition, the display panel 2000 may be a liquid crystal display panel of a color filter on transistor (COT) structure in which a thin film transistor, a color filter, and a black electrolyte are formed at the first' substrate 2100 and the second' substrate 2200 is bonded to the first' substrate 2100 with the liquid crystal layer interposed therebetween. That is, a thin film transistor may be formed on the first' substrate 2100, a protective film may be formed on the thin film transistor, and a color filter layer may be formed on the protective film. In addition, a pixel electrode in contact with the thin film transistor may be formed on the first' substrate 2100. At this point, in order to improve an aperture ratio and simplify a masking process, the black electrolyte may be omitted, and a common electrode may be formed to function as the black electrolyte.

In addition, when the display panel 2000 is the liquid crystal display panel, the display device may further include a backlight unit 3000 providing light from a rear surface of the display panel 2000.

That is, as shown in FIG. 22, the optical path control member may be disposed under the liquid crystal panel and on the backlight unit 3000, and the optical path control member may be disposed between the backlight unit 3000 and the display panel 2000.

Alternatively, as shown in FIG. 23, when the display panel 2000 is an organic light emitting diode panel, the optical path control member may be formed on the organic light emitting diode panel. That is, when the surface viewed by the user in the organic light emitting diode panel is defined as an upper portion of the organic light emitting diode panel, the optical path control member may be disposed on the organic light emitting diode panel. The display panel 2000 may include a self-luminous element that does not require a separate light source. In the display panel 2000, a thin film transistor may be formed on the first' substrate 2100, and an organic light emitting element in contact with the thin film transistor may be formed. The organic light emitting element may include an anode, a cathode, and an organic light emitting layer formed between the anode and the cathode. In addition, the second' substrate 2200 configured to function as an encapsulation substrate for encapsulation may be further included on the organic light emitting element.

That is, light emitted from the display panel 2000 or the backlight unit 3000 may move from the second substrate 120 toward the first substrate 110 of the optical path control member.

In addition, although not shown in drawings, a polarizing plate may be further disposed between the optical path control member 1000 and the display panel 2000. The polarizing plate may be a linear polarizing plate or an external light reflection preventive polarizing plate. For example, when the display panel 2000 is a liquid crystal display panel, the polarizing plate may be the linear polarizing plate. Further, when the display panel 2000 is the organic light emitting diode panel, the polarizing plate may be the external light reflection preventing polarizing plate.

In addition, an additional functional layer 1300 such as an anti-reflection layer, an anti-glare, or the like may be further disposed on the optical path control member 1000. In detail, the functional layer 1300 may be adhered to one surface of the first substrate 110 of the optical path control member. Although not shown in drawings, the functional layer 1300 may be adhered to the first substrate 110 of the optical path control member via an adhesive layer. In addition, a release film for protecting the functional layer may be further disposed on the functional layer 1300.

Further, a touch panel may be further disposed between the display panel and the optical path control member.

It is shown in the drawings that the optical path control member is disposed at an upper portion of the display panel, but the embodiment is not limited thereto, and the optical path control member may be disposed at various positions such as a position in which light is adjustable, that is, a lower portion of the display panel, or between a second substrate and a first substrate of the display panel, or the like.

In addition, it is shown in the drawings that the light conversion part of the optical path control member according to the embodiment is in a direction parallel or perpendicular to an outer surface of the second substrate, but the light conversion part is formed to be inclined at a predetermined angle from the outer surface of the second substrate. Through this, a moire phenomenon occurring between the display panel and the optical path control member may be reduced.

Referring to FIGS. 24 to 26, an optical path control member according to an embodiment may be applied to various display devices.

Referring to FIGS. 24 to 26, the optical path control member according to the embodiment may be applied to a display device that displays a display.

For example, when power is applied to the optical path control member as shown in FIG. 24, the reception part functions as the light transmitting part, so that the display device may be driven in the public mode, and when power is not applied to the optical path control member as shown in FIG. 25, the reception part functions as the light blocking part, so that the display device may be driven in the light blocking mode.

Accordingly, a user may easily drive the display device in a privacy mode or a normal mode according to application of power.

Light emitted from the backlight unit or the self-luminous element may move from the first substrate toward the second substrate. Alternatively, the light emitted from the backlight unit or the self-luminous element may also move from the second substrate toward the first substrate.

In addition, referring to FIG. 26, the display device to which the optical path control member according to the embodiment is applied may also be applied inside a vehicle.

For example, the display device including the optical path control member according to the embodiment may display a video confirming information of the vehicle and a movement route of the vehicle. The display device may be disposed between a driver seat and a passenger seat of the vehicle.

In addition, the optical path control member according to the embodiment may be applied to a dashboard that displays a speed, an engine, an alarm signal, and the like of the vehicle.

Further, the optical path control member according to the embodiment may be applied to a front glass (FG) of the vehicle or right and left window glasses.

The characteristics, structures, effects, and the like described in the above-described embodiments are included in at least one embodiment of the present invention, but are not limited to only one embodiment. Furthermore, the characteristic, structure, and effect illustrated in each embodiment may be combined or modified for other embodiments by a person skilled in the art. Accordingly, it is to be understood that such combination and modification are included in the scope of the present invention.

In addition, embodiments are mostly described above, but the embodiments are merely examples and do not limit the present invention, and a person skilled in the art may appreciate that several variations and applications not presented above may be made without departing from the essential characteristic of embodiments. For example, each component specifically shown in the embodiments may be modified and implemented. In addition, it should be construed that differences related to such a variation and such an application are included in the scope of the present invention defined in the following claims.

The invention claimed is:

1. An optical path control member comprising:
a first substrate;
a first electrode disposed on the first substrate;
a light conversion part disposed on the first electrode;
a second substrate disposed on the first substrate;
a second electrode disposed under the second substrate; and
an adhesive layer disposed between the light conversion part and the second electrode,
wherein the light conversion part includes a partition wall part and a reception part alternately disposed,
the reception part has a light transmittance that changes according to application of a voltage,
the adhesive layer includes a first interface between an upper surface of the adhesive layer and the second electrode and a second interface between a lower surface of the adhesive layer and the light conversion part,
the partition wall part includes
a first region from an upper surface of the partition wall part up to 30 μm toward the first substrate,
a third region from a lower surface of the partition wall part up to 30 μm toward the second substrate, and
a second region between the first region and the third region, and
a content of Si measured by X-ray photoelectron spectroscopy (XPS) in the first region is 2 at % or less.

2. The optical path control member of claim 1, wherein the first interface and the second interface have different adhesion from each other,
after adhering the second electrode and the light conversion part by the adhesive layer, adhesion of the second interface measured after 24 hours at 60° C. is 300 gf/25 mm or more.

3. The optical path control member of claim 1, wherein a difference between the content of Si measured by XPS in the first region and a content of Si measured by XPS in the third region is 1 at % or less.

4. The optical path control member of claim 1, wherein a difference between the content of Si measured by XPS in the first region and a content of Si measured by XPS in the second region is 1 at % or less.

5. The optical path control member of claim 1, wherein the light conversion part is formed of a photo-curable resin, and the photo-curable resin includes an oligomer, a monomer, a photopolymerization initiator, and an additive.

6. The optical path control member of claim 5, wherein the photo-curable resin has a swelling rate of 10% or less.

7. The optical path control member of claim 5, wherein the oligomer includes urethane acrylate.

8. The optical path control member of claim 5, wherein a number of branches of the monomer is five or more.

9. The optical path control member of claim 5, wherein when a weight of the photo-curable resin is 100 wt %, the additive is included in an amount of 0.5 wt % or less.

10. The optical path control member of claim 1, further comprising:
a first polymer material layer between the first electrode and the light conversion part; and
a second polymer material layer between the second electrode and the adhesive layer.

11. The optical path control member of claim 10, wherein a thickness of any one of the first polymer material layer and the second polymer material layer is 300 nm to 1500 nm.

12. The optical path control member of claim 10, wherein the adhesive layer includes a first interface between the upper surface of the adhesive layer and the second polymer material layer and a second interface between the lower surface of the adhesive layer and the light conversion part,
the adhesion of the first interface and the second interface is 300 gf/25 mm or more.

13. The optical path control member of claim 10, wherein the light conversion part is formed of a photo-curable resin.

14. The optical path control member of claim 13, wherein the photo-curable resin includes an oligomer, a monomer, a photopolymerization initiator, and an additive.

15. The optical path control member of claim 14, wherein the second polymer material layer includes a third interface between an upper surface of the second polymer material layer and the second electrode, and
the third interface does not include the additive.

16. The optical path control member of claim 10, wherein the first polymer material layer and the second polymer material layer include polyurethane acrylate.

17. The optical path control member of claim 16, wherein at least one of the first polymer material layer and the second polymer material layer has a Kel density of 90% or more.

18. The optical path control member of claim 10, wherein the first polymer material layer and the second polymer material layer have a Kel density of 95% or more.

19. A display device comprising:
a display panel; and
the optical path control member according to claim 11 disposed on the display panel.

20. The display device of claim 19, further comprising:
a first polymer material layer between the first electrode and the light conversion part; and
a second polymer material layer between the second electrode and the adhesive layer,
wherein at least one of the first polymer material layer and the second polymer material layer has a Kel density of 90% or more.

* * * * *